(12) United States Patent
Yamamoto et al.

(10) Patent No.: US 7,378,153 B2
(45) Date of Patent: May 27, 2008

(54) AMINO RESIN COMPOSITE PARTICLE AND METHOD OF PRODUCING SAME

(75) Inventors: Yasuhiro Yamamoto, Himeji (JP); Yasuhiro Shingai, Himeji (JP); Hideki Oishi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 328 days.

(21) Appl. No.: 10/230,409

(22) Filed: Aug. 29, 2002

(65) Prior Publication Data

US 2003/0113541 A1    Jun. 19, 2003

(30) Foreign Application Priority Data

Aug. 29, 2001 (JP) ............................. 2001-259668

(51) Int. Cl.
*B32B 1/00* (2006.01)
(52) U.S. Cl. .................. 428/407; 428/402; 428/403; 427/212; 427/222
(58) Field of Classification Search ............... 428/403, 428/407, 402; 427/212, 222
See application file for complete search history.

(56) References Cited

U.S. PATENT DOCUMENTS 4,069,176 A * 1/1978 Tsubakimoto et al. ...... 523/333
5,288,790 A * 2/1994 Nakahara et al. ........... 524/495
6,582,761 B1 * 6/2003 Nishimoto et al. ......... 427/203
6,610,818 B2 * 8/2003 Yamamoto et al. ......... 528/480
2004/0010114 A1 * 1/2004 Ozawa et al. ............... 528/367

FOREIGN PATENT DOCUMENTS

| JP | 52 051493 A | 4/1977 |
| JP | 051493 | 4/1977 |
| JP | 60 089754 A | 5/1985 |
| JP | 06 339624 A | 12/1994 |

* cited by examiner

*Primary Examiner*—Monique R. Jackson
(74) *Attorney, Agent, or Firm*—Nixon & Vanderhye, PC

(57) ABSTRACT

The present invention provides an amino resin composite particle in which an inorganic compound is fixed (firmly adhered) on a surface of an amino resin particle, for example, an amino resin composite particle, in which a child particle made of the inorganic compound is fixed on a mother particle made of the amino resin particle, and a method of easily and inexpensively producing the amino resin composite particle. After an amino compound such as benzoguanamine is reacted with formaldehyde, so as to prepare a reaction mixture containing an amino resin precursor to be the mother particle, an emulsion of the reaction mixture and an aqueous solution of an emulsifier, and an aqueous dispersion of the inorganic compound, such as silica powder, to be the child particle are mixed with a shear force application, so as to emulsify them to have an emulsion thereof. The emulsion is hardened by adding a catalyst. The thus obtained amino resin composite particle has a firm-adhering ratio of the inorganic compound of 10% or more.

19 Claims, 1 Drawing Sheet

AMINO RESIN COMPOSITE PARTICLE AND METHOD OF PRODUCING SAME

FIELD OF THE INVENTION

The present invention relates to an amino resin composite particle (a composite particle of an amino resin) and a method of producing the same. Such amino resin composite particle is suitable for use as a flatting agent for paint, a light scattering agent, rheology control agent, a column packing filler, an IC filler, a coating agent for a film, an additive for wax, an antibody, a conductive particle, a cosmetic, a particle for toner, an additive for toner, and abrasive powder, and the like.

(It should be noted that in the present specification the wording "a particle" and the wording "a compound" are used to collectively mean a "particle" of one kind and a "compound" of one kind, respectively (that is, those words are used as "collective nouns"), while a wording "a particulate" is used to mean an individual particulate of the particle/compound.)

BACKGROUND OF THE INVENTION

Some of the conventional methods of producing composite particles are the hybrid method, the microcapsule method, the spray coating method and the like, in which particles are coated (covered). For example, in the hybrid method, mother particle and child particle are dryly blended so as to inject (strike) particulates of the child particle into each particulate of mother particle, by means of collision energy (impact force or heat), thereby coating the mother particle with the child particle. The mother particle is made of a polyamide resin, a polyacryl resin, or the like, while the child particle is made of titanium oxide or silica.

However, the hybrid method associated with the dry blending has such a problem that the child particle cannot be injected (struck) into a surface of the mother particle when the mother particle gets harder than a certain level. Thus, the hybrid method is not suitable for producing a composite particle by fixing a particle of inorganic compound, such as titanium oxide, onto a surface of a particle having a bridge structure, such as an amino resin particle.

Besides the method described above, known as a method of processing the amino resin particle into the composite particle is a method in which the particle of the inorganic compound is adhered onto the surface of the amino resin particle by hardening a precursor of the amino resin (an amino resin precursor) in the presence of the inorganic compound. For example, the Publication of Japanese Unexamined Patent Application, Tokukaisho No. 52-51493 (published on Apr. 25, 1977) discloses a method in which a benzoguanamine resin precursor is emulsified with a melamine resin precursor and silica particle, and hardened by means of a catalyst, so as to produce an amino resin composite particle on which the silica particle is adhered.

However, in the method recited in the publication, the amino resin composite particle is obtained by simply hardening the benzoguanamine resin precursor by stirring. This does not fix the particulates of the silica particle on particulates of the amino resin particle. Thus, application of external force onto the amino resin composite particle removes most of the particulates of the silica particle from particulates of the amino resin particle.

In the method recited in the above publication, homomixing is used for the step of emulsification for preparing the amino resin precursor, but it does not concretely suggest the mixing with a shear force application for fixing the inorganic compound on the amino resin particle in steps following the step of emulsification, such as a step of mixing an inorganic compound in and a step of hardening. In short, the above publication suggests only the mixing of the amino resin particle and the inorganic compound. Thus, the above publication does not recite or suggest an amino resin composite particle in which the inorganic compound is fixed on a surface of the amino resin particle., and, of course, does not recite or suggest an amino resin composite particle in which the inorganic compound is fixed, with a high firm-adhering ratio, on a surface of the amino resin particle.

In the above publication, the inorganic compound is adhered on the amino resin particle only for preventing the amino resin particle from being aggregated together in the step of hardening, thus, the inorganic compound will be fallen off when the amino resin particle thus produced by the prior art of the publication is subjected to a usual process of the amino resin particle, such as drying, grinding, separation and classification of particle size, etc. In short, in the particle thus manufactured by the prior art, the inorganic compound is not actually strongly fixed on the surface of the amino resin particle, thereby failing to obtain an amino resin composite particle that attains the later-described object of the present invention.

Therefore, desired is an amino resin composite particle from which less inorganic compound particle is removed even if the external force is applied thereon, that is, an amino resin composite particle in which an inorganic compound particle is firmly adhered (fixed) on a surface of an amino resin composite particle, and a method of producing the amino resin composite particle inexpensively and easily.

SUMMARY OF THE INVENTION

The present invention has an object of providing an amino resin composite particle, in which an inorganic compound is fixed on a surface of an amino resin particle, for example, the inorganic compound is fixed (firmly adhered) as a child particle on the amino resin particle as a mother particle, and a method of producing the amino resin composite particle easily and inexpensively. More specifically, the inventors of the present application performed intensive studies on manufacturing conditions for fixing the inorganic compound on the surface of the amino resin particle, especially, mixing conditions for mixing the inorganic compound and an emulsion of an amino resin precursor. As a result of the intensive studies, the inventors of the present application found out mixing conditions suitable for stable production of the amino resin composite particle. Moreover, the inventors of the present application recognized importance of a firm-adhering ratio of an inorganic compound fallen off from the amino resin composite particle, as an indicative property of the amino resin composite particle as a final product of the method. The firm-adhering ratio can precisely indicate a state of the amino resin composite particle.

In order to attain the foregoing object, an amino resin composite particle of the present invention is an amino resin composite particle in which an inorganic compound is fixed on a surface of an amino resin particle, the amino resin composite particle having a firm-adhering ratio of the inorganic compound of 10% or more, where the firm-adhering ratio is calculated out by measuring a quantity of an inorganic compound fallen off from the surface of the amino resin composite particle by mixing, at an impeller tip speed (a head peripheral velocity) of 5.2 m/s, a suspension containing as a solid content 10% the amino resin composite particle by weight.

Especially, an amino resin composite particle of the present invention is arranged such that a child particle made of the inorganic compound is fixed on a surface of a mother particle made of the amino resin particle, the child particle having a firm-adhering ratio of 10% or more. In short, it is preferable that the inorganic compound is fixed as the child particle on the surface of the amino resin particle as the mother particle.

According to the arrangement, the amino resin composite particle is so arranged that the inorganic compound, for example, the child particle made of the inorganic compound has the firm-adhering ratio of 10% or more. Therefore, in the amino resin composite particle of the present invention, for example, even if an external force is applied thereon, a quantitative ratio of the inorganic compound (child particle) fallen off is smaller than that of a conventional amino resin composite particle. Thus, the arrangement provides an amino resin composite particle in which the inorganic compound is fixed on the surface of the amino resin particle, for example, the amino resin composite particle in which the child particle made of the inorganic compound is stably fixed on the surface of the amino resin particle.

Especially, the amino resin composite particle of the present invention has properties of an amino resin particle, and also has the properties derived from the inorganic compound fixed on the surface thereof.

In order to attain the object, a method of producing an amino resin composite particle of the present invention, the method fixing an inorganic compound on a surface of an amino resin particle so at to produce the amino resin composite particle, is so arranged to include a step of: (a) mixing an aqueous dispersion (a dispersion in water), in the presence of an emulsifier, with a shear force application, so as to fix the inorganic compound, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be fixed, and (II) an inorganic compound to adhere thereon, in such a manner that (I) the at least one of (XX) the amino resin precursor, (YY) the partially-hardened amino resin precursor, and (ZZ) the amino resin particle, and (II) the inorganic compound are dispersed in water.

In the aforementioned method, it is preferable that the inorganic compound is an inorganic compound in a particle form, and that a child particle made of the inorganic compound is fixed on a surface of an amino resin particle as a mother particle.

In the arrangement, in the presence of the emulsifier, with the shear force application, (I) the at least one of (XX) the amino resin precursor to be the amino resin particle, (YY) the partially-hardened amino resin precursor to be the amino resin particle, and (ZZ) the amino resin particle, on which the inorganic compound is to be fixed, and (II) the inorganic compound to adhere thereon, are mixed while (I) the at least one of (XX) the amino resin precursor, (YY) the partially-hardened amino resin precursor, and (ZZ) the amino resin particle, and (II) the inorganic compound are dispersed in water. Thus, with the arrangement, it is possible to adhere (fix) the inorganic compound on the amino resin precursor and/or the amino resin particle, by applying a high shearing force while the amino resin precursor and/or the amino resin particle (that is, at least one of the amino resin precursor to be the amino resin particle, a partially-hardened amino resin precursor to be the amino resin particle, and the amino resin) has a soft surface during emulsification. Thus, with the arrangement, it is possible to strongly fix (fix) the inorganic compound on the surface of the amino resin particle to be a nuclear particle (mother particle), thereby making it possible to easily and inexpensively provide such an amino resin composite particle that, even if an external force is applied thereon, the quantitative ratio of the inorganic compound (child particle) fallen off is smaller.

Especially, with the present invention, with which for example the amino resin precursor to be the mother particle and the inorganic compound to be the child particle is mixed (emulsified), in a presence of an emulsifier and with a shear force application, while the amino resin precursor and the inorganic compound are dispersed in water, then are hardened, it is possible to fix the child particle made of the inorganic compound on the surface of the mother particle made of the amino resin particle, without increasing a number of manufacturing steps, compared with a case where the coating of the surface is carried out. In other words, it is possible to fix the child particle on the surface of the mother particle easily and inexpensively. Moreover, because the mixing (emulsification) is carried out while a shear force is being applied (that is, with the shear force application), the child particle is firmly fixed on the mother particle, so that the child particle hardly falls off from the mother particle. With this arrangement, it is possible to easily and inexpensively produce the amino resin composite particle in which the child particle is fixed on the surface of the mother particle.

Moreover, an amino resin particle of the present invention is prepared by reacting an amino compound with formaldehyde so as to obtain an amino resin precursor having a methylol group, and then by mixing the amino resin precursor with an emulsifier so as to obtain an emulsion, and then adding a catalyst to the emulsion so as to harden the amino resin precursor to be the amino resin particle. Thus, specifically, the amino resin particle of the present invention may be an amino resin bridged particle. Thus, in the present specification, description of the mother particle in the amino resin composite particle may refer to a mother particle made of such amino resin bridged particle. Thus, the thus obtained amino resin composite particle may be an amino resin bridged composite particle.

For a fuller understanding of the nature and advantages of the invention, reference should be made to the ensuing detailed description taken in conjunction with the accompanying drawings.

DESCRIPTION OF THE EMBODIMENTS

First Embodiment

Described below is an embodiment of the present invention.

It should be noted that in the present embodiment two liquid conditions, namely "emulsion" and "suspension" are used to describe in which state a particle exists during production of amino resin particle (amino resin bridge particle) of the present invention. According to the general definitions, the "emulsion" is a liquid in which particulates are dispersed to be emulsified as colloidal particulates or as particulates larger than the colloidal particulates in a liquid. Meanwhile, the "suspension" is a liquid in which solid particulates are dispersed as colloidal particulates or as particulates as large as a size that can be seen with a microscope. Thus, in the production of the amino resin particle of the present invention, the word "emulsion" may be used to refer to a state in which particulates are emulsified, while the word "suspension" may be used to mean a state in which particulates are hardened. Moreover, during a step of hardening, both the states of "emulsion" and of "suspension" may coexist. In that case the word "suspension" may be used to refer to the liquid in which the particle is both in the states of "emulsion" and "suspension" during the step of hardening, in the present specification. Moreover, the dispersion containing the amino resin composite particle thus finally obtained by hardening is the suspension.

Figure 1:
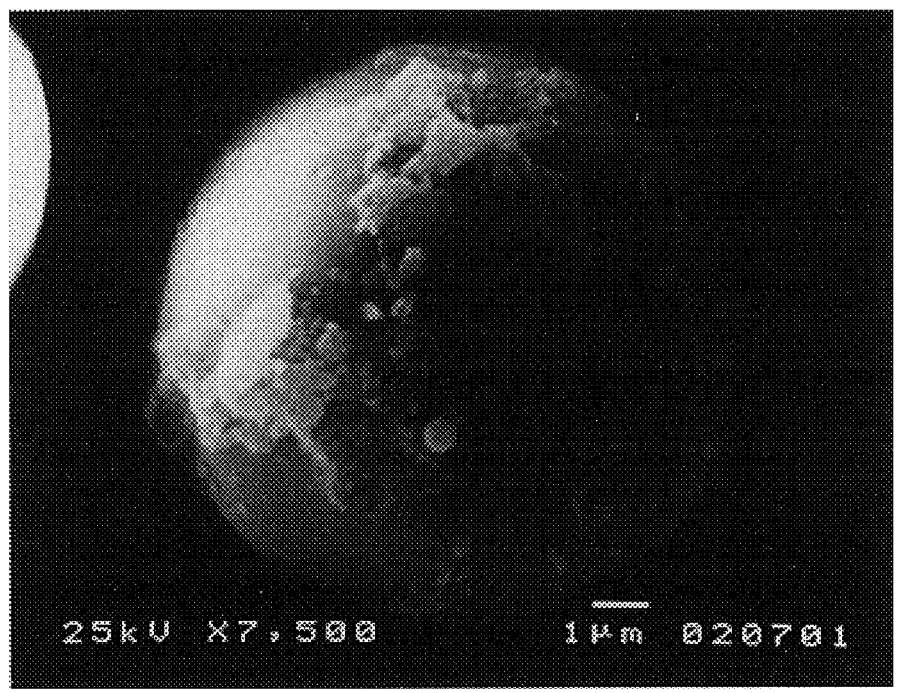
FIG. 1 is, as a figure-substituting photograph, an electron microscope photograph (7500×) showing a structure of an amino resin composite particle of an embodiment of the present invention.
Figure 2:
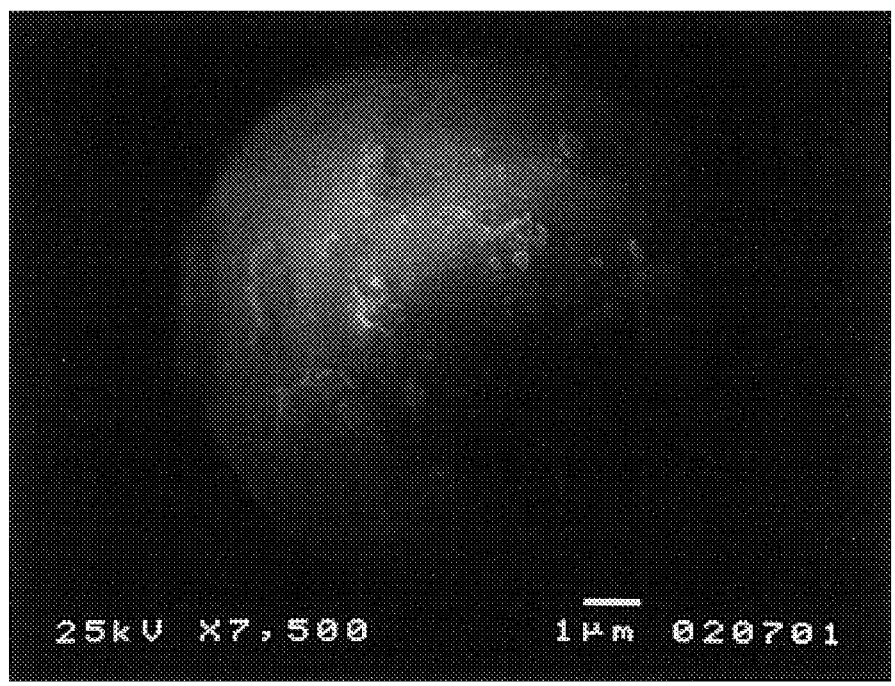
FIG. 2 is, as a figure-substituting photograph, an electron microscope photograph (7500×) showing a structure of another amino resin composite particle of the embodiment of the present invention.

An amino resin composite particle of the present invention is constituted by fixing (firmly adhering) an inorganic compound on a surface of an amino resin particle. The amino resin composite particle has a firm-adhering ratio (a ratio of inorganic compound firmly adhered on the amino resin particle) of 10% or more, the firm-adhering ratio being worked out by measuring how much the inorganic compound is fallen off from the amino resin composite particle by mixing at an impeller tip speed (a head peripheral velocity) of 5.2 m/s a suspension containing as a solid content, 10% of the amino resin composite particle by weight. As long as the firm-adhering ratio is 10% or more, and the inorganic compound fixed on the surface of the amino resin particle is firmly adhered thereon, there is no particular limitation on how the inorganic compound is fixed (firmly adhered) on the surface of the amino resin particle. For example, the inorganic compound may be firmly adhered as a layer coating the surface of the amino resin particle surface as a mother particle (nuclear particle). Alternatively, the inorganic compound may be firmly adhered as a child particle on the surface of the surface of the amino resin particle as a mother particle (nuclear particle). The latter is more preferable. Thus, it is preferable for the amino resin composite particle of the present invention that the amino resin composite particle has an arrangement in which the child particle made of the inorganic compound is fixed (firmly adhered) on the surface of the mother particle made of the amino resin with a firm-adhering ratio of the child particle of 10% or more. FIGS. 1 and 2 are electron microscopic photos (7500×) showing structures of the amino resin composite particles of the present invention of a later described sixth embodiment. In other words, FIGS. 1 and 2 show examples in which the inorganic compound is firmly adhered on the surface of the amino resin particle as the mother particle (nuclear particle).

Moreover, it is a preferable embodiment of the amino resin composite particle of the present invention having the firm-adhering ratio of 10% or more that (I) at least one of (XX) an amino resin precursor to be an amino resin particle, (YY) a partially-hardened amino resin precursor to be the amino resin particle, and (ZZ) the amino resin particle, and (II) an inorganic compound to adhere thereon are mixed in the presence of an emulsifier, with a shear force application, while (I) the at least one of (XX) the amino resin precursor, (YY) the partially-hardened amino resin precursor, and (ZZ) the amino resin particle, and (II) the inorganic compound are dispersed in water, so as to emulsify (XX) the amino resin precursor, or to suspend (YY) the partially-hardened amino resin precursor and/or (ZZ) the amino resin particle, thereby firmly adhering the inorganic compound thereon. Moreover, a method of the amino resin composite particle of the present invention described below is a preferable embodiment of production of the amino resin composite particle of the present invention having the firm-adhering ratio of 10% or more.

Moreover, a method of producing the amino resin composite particle of the present invention includes a step of firmly adhering an inorganic compound, which has a step of mixing (emulsifying or suspending) (I) at least one of (XX) an amino resin precursor to be an amino resin particle, (YY) a partially-hardened amino resin precursor to be the amino resin particle, and (ZZ) the amino resin particle, and (II) an inorganic compound to adhere thereon, in the presence of an emulsifier, with a shear force application, while (I) the at least one of (XX) the amino resin precursor, (YY) the partially-hardened amino resin precursor, and (ZZ) the amino resin particle, and (II) the inorganic compound are dispersed in water, thereby firmly adhering the inorganic compound on a surface of the at least one of (XX) the amino resin precursor to be the amino resin particle, (YY) the partially-hardened amino resin precursor to be the amino resin particle, and (ZZ) the amino resin particle.

By mixing (emulsifying or suspending) with the shear force application as described above, it is possible to, by means of the shear force, firmly adhere (fix) the inorganic compound on a soft layer formed on the surface of the amino resin precursor and/or the amino resin particle (that is, the at least one of (XX) the amino resin precursor to be the amino resin particle, (YY) the partially-hardened amino resin precursor to be the amino resin particle, and (ZZ) the amino resin particle). Therefore, according to the present invention, it is possible to fix (firmly adhere) a child particle made of the inorganic compound on a surface of the amino resin particle to be a nuclear particle (mother particle).

In the present invention, in case where the mixing (emulsification) of the amino resin precursor to be the amino resin particle, and the inorganic compound in the presence of the emulsifier, with the shear force application, while the amino resin precursor to be the amino resin particle, and the inorganic compound are dispersed, is carried out, a step of hardening the amino resin precursor by adding a catalyst so as to form the amino resin particle is further carried out. Moreover, it is preferable that the step of firmly adhering the inorganic compound includes a step of preparing an emulsion of the amino resin precursor by mixing an aqueous dispersion of the amino resin precursor to be the amino resin particle, and an aqueous solution of the emulsifier, and a step of mixing the thus prepared emulsion with the inorganic compound with a shear force application. By hardening the amino resin precursor by adding the catalyst (hardening catalyst), it is possible to attain the amino resin composite in which the child particle made of the inorganic compound is firmly adhered on the surface of the mother particle made of the amino resin particle (amino resin bridged particle) thus hardened, thus attaining the firm-adhering ratio of 10% or more. More specifically, in this way, it is possible to attain a suspension containing the amino resin composite particle. Moreover, in the step of mixing the thus prepared emulsion with the inorganic compound, it is preferable that an aqueous dispersion of the inorganic compound is mixed with the emulsion. It is more preferable that an emulsion of (α) an aqueous dispersion of the amino resin precursor to be the mother particle and (β) the aqueous solution of the emulsifier, is emulsified with the aqueous dispersion of the inorganic compound to be the child particle, with the shear force application, and then the catalyst is added thereon so as to harden the amino resin precursor. Thereby, it is possible to more efficiently attain the amino resin composite in which the child particle made of the inorganic compound is firmly adhered on the surface of the mother particle made of the amino resin particle (amino resin bridged particle) thus hardened, thus attaining the firm-adhering ratio of 10% or more.

The mother particle (amino resin particle) is obtained as follows. To begin with, the amino resin precursor that contains a methylol group is formed by reacting an amino compound with formaldehyde. Then, the amino resin precursor is mixed with an aqueous solution of an emulsifier so as to obtain an emulsion. Into the emulsion, a catalyst is added so at to harden the amino resin precursor, thereby forming the amino resin particle as the mother particle.

Specifically, amino compounds such as benzoguanamine (2,4-diamio-6-phenyl-sym.-triazin), cyclohexanecarboguanamine, cyclohexenecarboguanamine, and melamine may be used as the amino compound. Those amino compounds may be used solely, while two or more of the amino compounds may be used in combination. However, it is especially preferable that the amino compound is composed of at least one of the compounds selected from the group of the amino compounds listed above in a concentration within a range of 40% by weight to 100% by weight. Furthermore, it is most preferable that the amino compound is composed of benzoguanamine in the concentration within the range.

Water is used as a solvent for the reaction of the amino compound with formaldehyde. Specifically as to how formaldehyde is introduced, for example, formaldehyde may be introduced by a method of adding an aqueous solution of formaldehyde (formalin (Trademark)), or by a method of producing formaldehyde in a reaction mixture by adding trioxane or paraformaldehyde into water, and the like. The addition of the aqueous solution of formaldehyde is more preferable.

Formaldehyde is preferably in a ratio of 2 to 3 moles to 1 mole of the amino compound, and more preferably in a ratio of 2.0 to 2.5 moles to 1 mole of amino compound. It is not preferable that formaldehyde is out of the ratio, because amino compound or formaldehyde that is not reacted in the reaction is increased when the formaldehyde is out of the ratio. In addition, the greater amounts of the amino compound and formaldehyde to be added based on that of the water is preferable, that is, the higher concentrations of the amino compound and the formaldehyde at the time of the addition of the amino compound and the formaldehyde is preferable, as long as the reaction is not hindered due to the higher concentrations, that is, the greater amounts.

It is preferable that pH of the reaction mixture is neutral or weakly basic. For example, sodium carbonate, sodium hydroxide, potassium hydroxide, aqua ammonia or the like may be used for adjusting the pH of the reaction mixture, and there is no particular limitation in terms of quantity of sodium hydroxide or the likes to be used. The amino compound is reacted with formaldehyde in water so as to produce the amino resin precursor, which is a so-called initial condensation product. Reaction temperature is not particularly limited, but is preferred to be within a range of 95° C. to 98° C. It may be so arranged that the reaction is terminated, for example, by cooling the reaction mixture, when a viscosity of the reaction mixture reaches, for example, a range from $2 \times 10^{-2}$ Pa·s to $5.5 \times 10^{-2}$ Pa·s (20 cp to 55 cP). More specifically, when to terminate the reaction is determined by measuring, by using a process viscometer, when the reaction mixture attains the viscosity at a temperature ranging from 95° C. to 98° C. In this manner the reaction mixture containing the amino resin precursor, that is, an aqueous dispersion of the amino resin precursor (in which the amino resin precursor as dispersoid is dispersed in water as a dispersion medium) is prepared. By controlling the viscosity of the reaction mixture within the range, it is possible to obtain a mother particle having substantially even particulate diameters (that is, having a narrow distribution range of particle size). Moreover, the smaller the viscosity of the reaction mixture, the smaller particulate diameters the thus prepared mother particle has.

Moreover, the viscosity of the reaction mixture at the termination of the reaction is significantly higher than that of the aqueous solution of the amino compound and formaldehyde (at the beginning of the reaction). Therefore, the viscosity of the reaction mixture is hardly affected by concentrations and the like of a starting material (that is, the aqueous solution) used in the preparation. The amino resin precursor is soluble in an organic solvent, such as acetone, dioxane, methyl alcohol, ethyl alcohol, isopropyl alcohol, butyl alcohol, ethyl acetate, butyl acetate, methyl cellosolve, ethyl cellosolve, methyl ethyl ketone, toluene, and xylene. Meanwhile, the amino resin precursor is substantially insoluble in water.

The mother particle has the average particle diameter preferably in a range of 1 μm to 30 μm, more preferably in a range of 2 μm to 20 μm, and most preferably in 3 μm to 15 μm. In the manufacturing method of the present invention, it is possible to control the average particle diameter within a standard deviation of 6 μm or less, more preferably of 4 μm or less, most preferably of 2 μm. Note that the amino resin is not particularly limited in a degree of crosslinking (bridging), average molecular weight, distribution of the molecular weight, and the like properties.

The child particle is an inorganic compound. Specifically, the inorganic compound may be silica particle, conductive carbon powder, zirconia particle, titania particle, aluminum powder, an almina sol, a selye sol, and mica, for example. Those inorganic compounds may be used solely, while two or more of the inorganic compounds may be used in combination, alternatively. However, the silica particle and the conductive carbon powder are especially preferable. It is preferable that the inorganic particle as the child particle has an average particulate diameter 0.05 to 0.001 times that of the mother particle, specifically speaking, preferably within a range between a lower limit of 0.001 μm and an upper limit of 1.5 μm, more preferably within a range between a lower limit of 0.001 μm and an upper limit of 1.0 μm. The lower limit is more preferably 0.005 μm or more, and further preferably 0.01 μm or more. Meanwhile, the upper limit is more preferably 0.5 μm or less, and further preferably 0.2 μm or less. Note that, the child particle may have various shapes, such as board-like shapes, scale-like shapes, bar-like shapes, and fiber-like shapes, besides spherical shapes. The aqueous dispersion of the inorganic compound is prepared by dispersing the inorganic compound in water. A suitable range of a percentage of the inorganic compound in the aqueous dispersion is from 5% by weight to 30% by weight, even though the range is not particularly limited. Moreover, the aqueous dispersion may be prepared by adopting a known dispersion method. The inorganic compound is not particularly limited in terms of quantity to be used based on the weight of the amino resin precursor. However, the quantity of the inorganic compound is preferably 1% by weight to 50% by weight, further preferably 5% by weight to 20% by weight, based on the weight of the amino resin precursor. When the quantity of the inorganic compound is less than 1% by weight, this may result in failure to obtain the amino resin composite particle in which the child particle is evenly fixed on the mother particle. The amino resin composite particle (mother particle) of the present invention is so arranged that the inorganic compound (child particle) is fixed thereon. Here, it is necessary that the child particle is an inorganic compound. In addition, a compound other than the inorganic compound may be fixed, together with the inorganic compound, on the amino resin composite particle, as long as the compound does not give any bad effect on the amino resin composite particle.

An emulsifier is used to form protected colloid. Thus, the emulsifier may be polyvinyl alcohol, carboxyl methyl cellulose, sodium alginate, polyacrylic acid, a water-soluble salt of polyacrylic acid, and polyvinyl pyrrolidone, for example. Any of the emulsifiers may be used in a form of an aqueous solution in which a whole quantity of the emulsifier (that is, one or more of the emulsifiers) is dissolved in water. Alternatively, the emulsifiers may be used in such a manner that only part of the emulsifier is dissolved to make an aqueous solution, remaining the rest as it is (that is, in a power-form, in a grain-form, in a liquid-form, or in the like form). Considering stability of resultant liquid emulsion and mutual interaction with a catalyst, polyvinyl alcohol is the most preferable among the emulsifiers. Either of completely saponificated polyvinyl alcohol or partially saponificated polyvinyl alcohol may be used. Moreover, the water-soluble polymers forming the protected may have any degree of polymerization within such a range that does not retard the present invention. When a greater amount of emulsifier with respect to the amino resin precursor is to be used, the particle diameter of the mother particle becomes smaller. Based on the weight of the amino resin precursor, the quantity of the emulsifier used falls more preferably within a range from 1% by weight to 30% by weight, and further preferably within a range from 1% by weight to 5% by weight. When the quantity of the emulsifier is out of the range, the resultant liquid emulsion may have a poor stability.

The emulsion of the amino resin precursor on which the inorganic compound is adhered can be prepared by mixing the amino resin precursor to be the amino resin particle, with the inorganic compound to be firmly adhered thereon, in the presence of the emulsifier, while a shear force is applied therein, and while the amino resin precursor and the inorganic compound are dispersed in water. More specifically, the emulsion can be prepared by mixing an aqueous dispersion of the amino resin precursor with the aqueous solution of the emulsifier and the inorganic compound, with the shear force application (that is, while the shear force is applied therein), for example, at a temperature ranging from 70° C. and 100° C., that is, by emulsifying the aqueous dispersion of the amino resin precursor and the inorganic compound. Ideally, for example, the emulsion of the amino resin precursor on which the inorganic compound is adhered is prepared by mixing aqueous dispersion of the amino resin precursor, and the emulsifier together with the shear force application, and for example, at a temperature within a range from 70° C. to 100° C., so as to prepare an emulsion of the amino resin precursor. Into the emulsion of the amino resin precursor, the inorganic compound is mixed, ideally in a form of the aqueous dispersion of the inorganic compound. Then, the inorganic compound is emulsified with the shear force application, for example, at a temperature within a range between 20° C. and 100° C. Thereby, the emulsion of the amino resin precursor on which the inorganic compound is adhered is prepared.

It may be so arranged that the aqueous dispersion of the amino resin precursor, the aqueous solution of the emulsifier, and the inorganic compound be added together at the same time so as to make the emulsion. If the inorganic compound is added prior to the emulsification of the amino resin precursor, it may result in that the inorganic compound enters an inside of the particulates of the amino resin precursor. For efficiently firmly adhering the inorganic compound onto the surface of the particulates, it is preferable that the inorganic compound is added after making the emulsion by mixing the aqueous solution of the amino resin precursor with the aqueous solution of the emulsifier so as to prepare particulates of the amino resin precursor with the particle diameter and the particle size distribution thereof adjusted. Here, it is preferable that the inorganic compound is added after making the emulsion that is shown to have the mother particle having the average particle diameter preferably in a range of 1 μm to 30 μm, more preferably in a range of 2 μm to 20 μm, and most preferably in 3 μm to 15 μm. In the manufacturing method of the present invention, it is possible to control the average particle diameter within a standard deviation of 6 μm or less, more preferably of 4 μm or less, most preferably of 2 μm.

Moreover, the inorganic compound is ideally added in a form of the aqueous dispersion of the inorganic compound. The addition of the aqueous dispersion of the inorganic compound allows the inorganic compound to be more efficiently firmly adhered on the surface of the thus amino resin particle (mother particle). In addition, it is preferable that the emulsifier is added in a form of the aqueous solution, so as not to retard the formation of the particulates of the amino resin precursor.

Here, the emulsion has a concentration of the amino resin precursor (that is, a solid content concentration) preferably within a range of 30% by weight to 60% by weight. More preferably, a percentage of the inorganic compound in the emulsion (a solid material quantity) is in a range of 5% by weight and to 20% by weight. Therefore, a percentage of the inorganic compound in the aqueous dispersion of the inorganic compound (solid material quantity) and the concentration of the solution for the case in which the solution of the emulsifier is prepared and mixed with, are not specifically limited, provided that the percentage and quantity allow adjustment of the concentration of the amino resin precursor in the emulsion and the percentage of the inorganic compound. When the concentration of the amino resin precursor is less than 30% by weight, productivity of the amino resin composite particle is decreased. On the other hand, when the concentration of the amino resin precursor is more than 60% by weight, the thus produced mother particle is outsize or is aggregated, that is, such concentration of the amino resin precursor makes it impossible to control the particle diameter of the amino resin composite particle, so that only such amino resin composite particle having uneven particle diameters (having a wide particle size distribution) will be produced.

In the present invention, (αα) the aqueous dispersion of the amino resin particle, which is the amino resin precursor to be the mother particle (nuclear particle), and (ββ) the aqueous dispersion of the inorganic compound to be fixed thereon, for example, the inorganic compound to be the child particle, are emulsified with the shear force application, thereby firmly adhering the inorganic compound on the surface of the amino resin precursor. It is preferable to use a mixing apparatus having a high shear force for emulsifying the amino resin precursor and the inorganic compound with the shear force application.

As a mixing apparatus capable for use in mixing with a shear force, that is, the mixing apparatus having the high shear force, those mixing apparatus may be employed for example: (1) an apparatus for mixing a liquid and a liquid, or a solid and a liquid while shearing the liquid and the liquid, or the solid and the liquid with blades (impellers) revolving at a high velocity (shearing by high-speed stirring), (2) an apparatus for mixing a liquid and a liquid, or a solid and a liquid by colliding the liquid and the liquid, or the solid and the liquid at a high discharging pressure of 4.9 MPa to 4.9 MPa (50 kgf/cm² to 500 kgf/cm²) thereby colliding themselves against each other (shearing by a high discharging pressure), (3) an apparatus for mixing a liquid and a liquid, or a liquid and a solid by introducing or forcibly circulating, at a discharging pressure of (0.196 MPa to 1.47 MPa (2 kgf/cm² to 15 kgf/cm²) by means of a pump or the like, the liquid and the solid, in a bath tank provided with subsequent baffle plates for turning, by 90 degrees (at a right angle), a flow direction of the liquid and the liquid, or the liquid and the solid thus introduced (stress shearing). The subsequent baffle palates are provided subsequently. Specifically, employable as the mixing apparatus of Type (1) are, for example, a homomixer, the TK homomixer (Product Name; manufactured by Tokushu Kika Kogyo Co., Ltd., Japan: provided with turbine-like shaped blades), a high-speed dispersion mill, a homodispersion mill, the TK lab dispersion mill (Product Name; manufactured by Tokushu Kika Kogyo Co., Ltd., Japan: provided with turbine-like shaped blades), EBARA Milder (Product Name; manufactured by Ebara manf. Co., Ltd.: provided with a Sutto turbine-like shaped blades), and the like. Specifically, employable as the mixing apparatus of Type (2) is the high pressure homogenizer (Product Name; manufactured by Izumi Food Machinery Co., Ltd.), for example. As the mixing apparatus of Type (3), the static mixing apparatus (Product Name; manufactured by Noritake Company Limited) is employable, for example. However, the mixing apparatus is not limited to those listed above. An apparatuses (a machine type) applying the same principle gives the same effect.

In the present invention, the wording "high shear force" indicates shear forces described below:

a shear force produced by heads of the blades revolving at an impeller tip speed (a head peripheral velocity) of 2 m/s or more, preferably of 5 m/s or more (usually the impeller tip speed has an upper limit of 30 m/s), the shearing force being for use in a case where a liquid and a liquid, or a solid and a liquid are mixed together while shearing them by blades revolving at a high velocity (shearing by the high-speed stirring), that is, more specifically, in a case where the mixing apparatus of Type (1) is used for mixing the aqueous dispersion (emulsion and/or suspension) containing, for example, the amino resin precursor to be the amino resin particulates (mother particle), with the emulsifier and the inorganic compound to be fixed onto the amino resin particle, more specifically in a case where the emulsion and/or suspension prepared by emulsifying (and/or suspending) the amino resin precursor and/or the amino resin particle in the presence of the emulsifier, is mixed with the aqueous dispersion of the inorganic compound by using the mixing apparatus of type (1);

a shear force produced by a discharging pressure of 3 MPa or more (that is, between 3 MPa and 49 MPa), preferably 5 MPa or more (that is, between 5 MPa and 49 MPa), in case a liquid and a liquid, or a solid and a liquid are mixed by colliding the liquid and the liquid, or the solid and the liquid at a high discharging pressure thereby colliding themselves against each other (shearing by the high discharging pressure), that is, more specifically, in a case where for example the emulsion and/or suspension containing the amino resin precursor and/or the amino resin particle and the aqueous solution of the emulsifier, is mixed, by using the mixing apparatus of Type (2), with the aqueous dispersion of the inorganic compound by discharging the aqueous dispersions so as to collide the amino resin precursor and/or the amino resin particle and the inorganic compound together (shearing by the high discharging pressure); and a shear force produced by a discharging pressure of 0.1 MPa or more, (that is, between 0.1 MPa and 1.47 MPa), preferably 0.5 MPa or more, (that is, 0.5 MPa and 1.47 MPa) in case the mixing is carried out by introducing or forcibly circulating by means of a pump or the like, the liquid and the liquid, or the solid and the liquid, in a bath tank provided with subsequent baffle plates (that is, the baffle plates are provided subsequently) for turning, by 90 degrees (at a right angle), a flow direction of the liquid and the liquid, or the liquid and the solid thus introduced (stress shearing), that is, more specifically, in case the emulsion and/or suspension prepared by emulsifying and/or suspending the amino resin precursor and/or the amino resin particle in the presence of the emulsifier is mixed with (II) the aqueous solution of the inorganic compound by using the apparatus of Type (3).

As described above, the present invention employs such mixing apparatus having such high shear force for use in fixing an inorganic compound, more specifically, the inorganic compound as the child particle, onto the surface of the amino resin particulates (amino resin bridging particulates) as the mother particulate (nuclear particulates). On the contrary, the prior art of the known art recites nothing about the shear force of the mixing apparatus having the high shear force, because the prior art fails to clearly recognize the need of fixing (firmly adhering) the inorganic compound onto the surface of the amino resin. Moreover, the amino resin composite particle of the present invention has not been a target particle to be isolated specifically, and specific conditions for obtaining the particle has not yet studied concretely. Therefore, it has been very difficult to obtain stably an amino resin composite particle having a high firm-adhering ratio so as to meet the need. The present invention defines the shear force of the mixing apparatus for use in firmly adhering the inorganic compound onto the surface of the amino resin particle, as described above, in terms of the impeller tip speed of the high-speed mixing shear force, the discharging pressure of the shearing under high pressure, and the discharging pressure of stress shearing, and discloses specific mixing conditions in the production of an amino resin composite particle (amino resin bridging composite particle) in which the inorganic compound is fixed on the surface of the amino resin particle. In the amino resin composite particle produced by the method of the present invention, the inorganic compound is firmly adhered onto the surface of the amino resin particle. Therefore, in the present invention, this property is defined by a "firm-adhering ratio".

The mixing apparatus (the mixing apparatus having the high shearing force) is used for mixing (ααα) the emulsion of the aqueous dispersion of the amino resin precursor and aqueous solution of the emulsifier with (βββ) the aqueous dispersion of the inorganic compound, that is, for mixing the emulsion of the amino resin precursor and the aqueous solution of the emulsifier with the inorganic compound with the shear force application. In the present embodiment, the high shearing force is not particularly required for the formation of the amino resin precursor. Moreover, the high shearing force is not required for mixing at a low speed (with a low shear force) for hardening so as to obtain the amino resin particle, and for hardening the amino resin precursor in the presence of a catalyst (hardening catalyst) to obtain the amino resin particle, or for mixing at a low speed (with a low shear force) so as to slightly aggregate particulates of the particle together so as to make the particle more easily filtered out. On the other hand, when mixing the aqueous solution of the amino resin precursor with the emulsifier, that is, when mixing the aqueous solution of the amino resin precursor with the aqueous solution of the emulsifier, it is preferable to use the mixing apparatus capable of applying a high shearing force so that the particle will be so formed as to have a narrow particle size distribution. Thus, a preferable combination of the mixing apparatus and a mixer (combination of mixing methods) is explained below. Namely, a general mixer is used for forming the amino resin precursor. For mixing the aqueous dispersion of the amino resin precursor with the emulsifier (the aqueous solution of the emulsifier), and for mixing the aqueous dispersion of the amino resin precursor with the inorganic compound (the aqueous dispersion of the inorganic compound), the mixing apparatus capable of applying a high shearing force is used. For adding the hardening catalyst so as to harden the amino resin precursor, the general mixer is used.

In the present embodiment, mixing means are referred to as the mixer, the mixing device, and the mixing apparatus (the mixing apparatus having a high shearing force). The mixer is a mixing means for used in preparing the amino resin precursor by reacting the amino compound, such as benzoguanamine, with formaldehyde (such as, formalin; Trademark) with an application of heat, and in condensing to hardness the emulsion of the amino resin precursor. The mixing device is a mixing means for use in emulsifying the amino resin precursor in the presence of the emulsifier (such as polyvinyl alcohol). The mixing apparatus is a mixing means for use in mixing the aqueous dispersion of the inorganic compound, and (I) at least one of (XX) the emulsion of the amino resin precursor and the aqueous solution of the emulsifier (YY) the suspension of the amino resin particle containing the amino resin precursor that is partially hardened, and the aqueous solution of the emulsifier, that is, the suspension of the amino resin precursor, or (ZZ) the emulsion of the amino resin particle (amino resin bridged particle) that has been already hardened and the aqueous solution of the emulsifier, in order to firmly adhere the inorganic compound, for example, the child particle made of the inorganic compound on the surface of the amino resin particle (amino resin bridged particle).

According to the present invention, it is possible to firmly adhere the inorganic compound onto the surface of the amino resin precursor within a short time (for example about 1 to 3 minutes). Thus, there is no particular limitation in a time for the emulsification of the aqueous dispersion of the amino resin precursor and the aqueous dispersion of the inorganic compound with the application of the shearing force.

According to the present invention, in which the catalyst is added into the emulsion containing the amino resin precursor so as to harden the amino resin, it is possible to obtain an amino resin composite particle (amino resin bridged composite particle) in which the inorganic compound, for example, child particle made of the inorganic compound, is firmly adhered on the surface of the amino resin particle (amino resin bridged particle). The addition of the catalyst is not particularly limited to a particular method, but it is preferable that a whole quantity of the catalyst is added into the emulsion at once, so as to obtain an amino resin composite particle in which the child particle is evenly firmly adhered on the mother particle. The hardening is ideally carried out at a reaction temperature (hardening temperature) ranging from 15° C. (ordinary temperature) to 100° C. It is possible to check when the reaction is end (end point of the reaction) by sampling or by visual check. Thus, there is no particular limitation in terms of the reaction time.

As the catalyst (hardening catalyst), acids are suitable, for example: mineral acids such as hydrochloric acid, sulfuric acid, and phosphoric acid; ammonium salts of those mineral acids; sulfamic acid; sulfonic acids such as benzene sulfonic acid, paratoluene sulfonic acid, and dodecyl benzene sulfonic acid; organic acids such as phthalic acid, benzoic acid, acetic acid, propionic acid, and salicylic acid; and the like. However, the catalyst is not limited to a specific acid. Those catalysts may be used solely, while more than two of them may be used in combination. In terms of a quantity, the catalyst is suitably used in quantity range of 0.1 parts by weight to 5 parts by weight, based on the weight of the amino resin precursor as 100 parts by weight. A quantity of the catalyst exceeding 5 parts by weight deteriorates the emulsion thereby causing aggregation of the mother particle. On the other hand, a quantity of the catalyst less than 0.1 parts by weight requires a long time for the reaction or causes insufficient hardening.

In the present invention, the condensation and hardening of the emulsion of the amino resin precursor together with the inorganic compound in the presence of the catalyst produce the amino resin composite particle, which is a thermosetting resin, and in which the inorganic compound is firmly adhered on the surface of the amino resin particle, in other words, the amino resin composite particle, which is so-called two-component particle of the present invention, in which the child particle is firmly adhered on the mother particle.

As described above, in the present invention, the inorganic compound is dispersed and adhered onto the surface of the amino resin precursor with the high shear force, during the emulsification of the amino resin precursor, during which the surface of the emulsified amino resin precursor is still soft (is not hardened yet or is partially hardened). This fixes (firmly adheres) the inorganic compound on the surface of the amino resin particle (amino resin bridging particle).

However, some of the inorganic compounds, as the inorganic compound to adhere onto the amino resin particle, in some cases, may damage the thus emulsified amino resin particle when added (introduced) during the emulsification of the amino resin particle (that is, when emulsifying the amino resin precursor in the presence of the emulsifier). The damaged amino resin precursor may be emulsified and aggregated. Where this may happen, it is preferable that the catalyst (hardening catalyst) is added before the addition of the inorganic compound, so that the hardening of the amino resin precursor is slightly accelerated or completed, so that the inorganic compound is added after the amino resin particle (amino resin bridging particle) is formed to some degree so that the inorganic compound is adhered (firmly adhered) onto the amino resin particle as the mother particle (nuclear particulates) with a shear force (high shear force). However, in this case, the amino resin particle or the amino resin precursor as the mother particle is harder because of the hardening. This hinders the inorganic compound from adhering onto the amino resin particle or the amino resin precursor. Therefore, in this case, it is preferable that an emulsifier is added again, for example, in a form of an aqueous solution of the emulsifier, so as to suspend, in the present of the emulsifier, the aqueous dispersion containing the amino resin precursor that is partially hardened and/or the amino resin particle that has been hardened, thereby forming a soft layer on the surface of the amino resin particle to be the mother particle (nuclear particle). The inorganic compound is adhered (firmly adhered) onto the soft layer by means of the shear force. On adding the inorganic compound in the reaction mixture (suspension) containing the amino resin precursor that has not been hardened yet, the emulsifier used for the emulsification of the amino resin precursor exists in the reaction mixture (suspension), further the amino resin precursor that has not been hardened yet has a particle surface still so soft. For this reason, it is not necessary to add the emulsifier again.

Moreover, it is more preferable that formaldehyde, for example in the form of aqueous solution (formalin (Trademark)), is added, so as to suspend the aqueous dispersion containing the amino resin precursor that is partially hardened and/or the amino resin particle that has been hardened, in the present of the emulsifier and formaldehyde. To adhere the inorganic compound onto the amino resin precursor that is partially hardened and/or the amino resin particle that has been hardened, the addition of the emulsifier into the aqueous dispersion containing the amino resin precursor and/or the amino resin particle, is not sufficient to provide enough adherence power between the surface of the amino resin precursor and/or the amino resin particle as the mother particle (nuclear particulates) and the soft layer later-formed on the mother particle by the suspension. In such case, the later-formed soft layer is easily peeled off when dried. By adding formaldehyde again, for example, in the form of formaldehyde solution, and suspending in the presence of the again-added formaldehyde and the emulsifier, a chemical linkage is formed between the surface of the mother particle and the soft layer that is later formed on the surface of the mother particle by the suspension. This prevents the soft layer from being peeled off when dried, thereby producing an amino resin composite particle having a high firm-adhering ratio.

When, as described above, the aqueous dispersion of the inorganic compound, and if necessary, the emulsifier (aqueous solution of the emulsifier) and formaldehyde (aqueous solution of formaldehyde (for example, formalin (Trademark))), are added into the reaction mixture in which the amino resin precursor that is partially hardened or is hardened, and then are suspended with a shear force, it is preferable that the suspension is carried out at a temperature below a temperature (hardening process temperature) at which the hardening is carried out. More specifically, it is preferable that the suspension is carried out at a temperature 0° C. to 20° C. lower than the temperature at which the hardening is carried out. Moreover, in case the inorganic compound is added into the reaction mixture in which the amino resin partially hardened, and suspended, a temperature of the reaction mixture is adjusted, after the suspension, to a reaction temperature before the addition of the inorganic compound. Then, the hardening step is continued. Note that the shear force (high shear force) applied during the suspension in this case is equivalent to the shear force (high shear force) described above.

The emulsifiers listed above may be used as the emulsifier to be again added. The emulsifier may be added in the form of the aqueous solution in which a whole quantity of the emulsifier is solved in water, or may be added partially as the aqueous solution and partially as it is (for example, in a powder form, in a grain form, or in a liquid form) (that is, a part of the emulsifier is dissolved in water to make the aqueous solution and added as the aqueous solution of the emulsifier, while the rest of the emulsifier is added in the original form, that is, as it is).

For suspending, with the shear force application, the aqueous solution containing the amino resin precursor in which the amino resin that is partially hardened and/or the amino resin particle that is hardened, and the inorganic compound, the quantity of the emulsifier to be used is preferably in a range from 0.1% by weight to 30% by weight, more preferably in a range from 0.5% by weight to 5% by weight, based on the aqueous solution containing the amino resin precursor in which the amino resin that is partially hardened and/or the amino resin particle that is hardened. The stability of the suspension tends to be poor when the quantity of the emulsifier to be used is out of the range. Especially, if the quantity is small, there is a risk that the inorganic compound is not firmly adhered on the aqueous solution containing the amino resin precursor in which the amino resin that is partially hardened and/or the amino resin particle that is hardened.

Moreover, as to how the formaldehyde is again added in the above case (a method of the addition), the aqueous solution of the formaldehyde (formalin (Trademark)) may be added, or trioxane or paraformaldehyde may be added in water to prepare formaldehyde in the reaction mixture, even though the addition of the aqueous solution of formaldehyde is more preferable. In this case, it is preferable that the formaldehyde is used in such a quantity one to ten times greater than that of the emulsifier added. When the quantity of formaldehyde used is lower than the range, the soft layer that is later formed by the suspension becomes easily peeled off during drying. Because of this, benefit of the addition of formaldehyde may not be attained. On the other hand, when the quantity of formaldehyde used exceed the range, more formaldehyde is left over in the reaction.

Moreover, because of the above-mentioned reason, it is preferable that, during the suspending step, the solid content concentration in the suspension, that is, a total concentration of the amino resin precursor and the amino resin particle in the suspension, is within a range of 30% by weight to 60% by weight. Further, it is more preferable that the inorganic compound has, in the suspension, a percentage (solid material quantity) of 5% by weight to 20% by weight. Therefore, in this case again, there is no particular limitation as to ($\alpha$) the percentage (solid material quantity) of the inorganic compound to the aqueous dispersion of the inorganic compound, and ($\beta$) the concentration of the aqueous solution of the emulsifier to be mixed in, provided that the percentage and the concentration keep the concentration of the amino resin precursor and the amino resin particle in the suspension and the percentage of the inorganic compound within the ranges.

Moreover, again for the suspending step, there is no particular limitation as to a time for suspending the aqueous dispersion of the amino resin precursor that is partially hardened and/or the amino resin particle and the aqueous dispersion of the inorganic compound with the application of the shearing force, because the fixation (firmly adhering) of the inorganic compound is carried out in such a short time. Note that, as described above, hardening reaction is further continued in case of the suspending of the reaction mixture that is partially hardened, in which the inorganic compound is added. In addition, the conditions of this hardening reaction, such as the hardening temperature and the hardening time, are identical to those mentioned previously. Thus obtained amino resin compound particle is removed from the reaction mixture and heated to dryness, thus finalizing the production of the amino resin composite particle.

As the inorganic compound to be added in the reaction mixture after the amino resin precursor is hardened to some extent or after the end of the hardening, zirconia particle, titania particle, selye sol are examples.

Moreover, in the present invention, the amino resin composite particle may be colored depending on its needs. The amino resin has a high affinity with dyes. Specifically, the dyes may be water-soluble dyes or oil-soluble dyes, for example, water-soluble monoazo dyes, water-soluble polyazo dyes, metal-containing azo dyes, dispersive azo dyes, anthraquinone acid dyes, anthraquinone vat dyes, indigo dyes, sulfide dyes, phthalocyanine dyes, diphenylmethane dyes, triphenylmethane, nitro dyes, nitroso dyes, thiazole dyes, xanthene dyes, acridine dyes, azine dyes, oxazine dyes, thiazine dyes, benzoquinone dyes, naphthoquinone dyes, and cyanine dyes. Moreover, the amino resin can be colored with pigments. The dye may be added at any timing. It is preferable to add the dye in a form of dispersion in which the dye is dispersed in water, or in a form of aqueous solution in which the dye is dissolved in water.

The producing method of the present invention may include a step of neutralization of the suspension containing the amino resin composite particle (amino resin composite bridged particle) thus obtained by the hardening. It is preferable that the neutralization is carried out in case an acid catalyst such as sulfuric acid is used as the hardening catalyst. With the neutralization, it is possible to remove the acid catalyst (more specifically, to neutralize the acid catalyst). Thereby, for example when the amino resin composite particle is heated during a later described heating step, it is possible to prevent a color change (for example a color change to be yellow) in the amino resin particle to be the mother particle (nuclear particle), and further the amino resin composite particle having the amino resin particle as the mother particle (nuclear particle). Moreover, the neutralization is preferable that the neutralization is also effective for preventing a color change to make the color more yellowish for the colored amino resin composite particle, thereby providing a particle having an excellent heat resistance and a vivid color. Thus, it is a preferable embodiment that the amino resin composite particle is produced by a method including the step of neutralization.

Here, for the neutralization, the pH of the suspension containing the amino resin composite particle is increased preferably to 5 or above, more preferably to be between 5 and 9. When the pH is lower than 5, there is still the acidic catalyst. In this case, the color of the amino resin composite particle will be changed during the later-described heating step. The neutralization, which adjusts the pH of the suspension to be within the range, makes it possible to attain the amino resin composite particle that is hard, highly tolerant against solvents, highly heat resistant, and free from the color change.

As a neutralizer for use in the neutralization, for example, alkaline compound is suitable. As the alkaline compound, sodium carbonate, sodium hydroxide, potassium hydroxide, and ammonia may be used, for example. Sodium hydroxide is preferable among them. Thus, an aqueous solution of sodium hydroxide is suitably used. Those alkaline compounds may be used solely or in combination in which two of them are used.

The amino resin composite particle is easily removed from the reaction mixture, for example, by filtration or by means of a separating apparatus such as a centrifugal separator, but how to remove the amino resin composite particle is not limited to a particular method. In addition, the amino resin composite particle thus removed from the reaction mixture may be washed if necessary.

The thus removed amino resin composite particle is dried, for example, at a temperature of 100° C. to 200° C. There is no particular limitation in the drying of the amino resin composite particle in terms of its drying temperature and drying method. The drying step may be carried out until a water content of the amino resin composite particle reaches 3% by weight, for example. Alternatively, the thus removed amino resin composite particle may be subjected to a heat treatment in order to further improve the amino resin composite particle in terms of solvent resistance, water resistance, and heat resistance. There is no particular limitation in the heat treatment in terms of a heating temperature and a heating method. The amino resin composite particle may be ground (cracked), and classified. Note that the amino resin composite particle thus produced by the method of producing of the present invention is hardly aggregated so that the amino resin composite particle can be sufficiently ground by applying a small amount of force (weight of a load).

In the producing method of the present invention, for example, the aqueous dispersion of the amino resin precursor to be the mother particle and that of the inorganic compound to be the child particle is mixed together, and emulsified with the shear force application. The resultant emulsion is, then, hardened. Therefore, it is possible to firmly adhere the child particle made of the inorganic compound onto the mother particle made of the amino resin in a fewer or equal number of manufacturing steps compared with a method in which the surface of the amino resin is coated (for example, the hybrid method, microcapsule method, and spray coating method). In short, the child particle is firmly adhered onto the mother particle easily and inexpensively, according to the present invention.

Moreover, in the present invention, mixed (emulsified and/or suspended) with the shear force application are (α) the emulsion and/or suspension containing the amino resin precursor to be the amino resin particle and/or the amino resin particle and the aqueous emulsifier, and (β) the inorganic compound to be fixed thereon (aqueous dispersion of the inorganic compound). Therefore, the inorganic compound, such as the child particle made of the inorganic compound, is firmly adhered on the mother particle, so that the inorganic compound, such as the child particle made of the inorganic compound, will hardly fall off. This makes it possible to produce, easily and inexpensively, an amino resin composite particle in which the inorganic compound is firmly adhered on the surface of the amino resin particle with a firm-adhering ratio of 10% or more, especially, an amino resin composite particle in which the child particle is firmly adhered on the surface of the mother particle with a firm-adhering ratio of 10% or more.

Based on the quantity of the inorganic compound used, it is preferable that 30% to 100% of the inorganic compound is adhered onto the amino resin particle, and it is more preferable that 50% to 100% of the same is adhered thereon (that is, preferable is an adhering ratio of 30% to 100%, and more preferable is that of 50% to 100%). If the adhering ratio is out of the range, an appropriate amount of electrostatic charge may not be given to the thus obtained amino resin composite particle as a toner particle or an additive for toner.

Moreover, a content by percentage of the inorganic compound in the amino resin composite particle of the present invention is preferably in a range of 1% by weigh to 30% by weight, and more preferably in a range of 2% by weight to 30% by weight. When the content by percentage is out of the range, an appropriate amount of electrostatic charge may not be attained when the thus obtained amino resin composite particle is used as toner particle or an additive for toner.

Furthermore, in the amino resin composite particle of the present invention, the firm-adhering ratio of the inorganic compound, for example, the firm-adhering ratio of the child particle made of the inorganic compound, is preferably 10% or more and 100% or less, and as to the lower limit, more preferably, 30% or more, further preferably 50% or more, especially preferably 70% or more. In the present invention, the "firm-adhering ratio" is calculated in the following measuring method (procedure) described below.

The firm-adhering ratio in the present invention is calculated out by, firstly applying a shear force to the suspension of the amino resin composite particle of the present invention on the surface of which the inorganic compound is firmly adhered, so as to fall off inorganic compound that is not firmly adhered, secondly centrifugally separating from the suspension subjected to the shear force application the amino resin particle from which the inorganic compound is fallen off and the fallen-off inorganic compound. In the following fall-off test, the inorganic compound (specifically, the particulates of the inorganic compound) is dispersed in the suspension resulted from the fall-off test so that the inorganic compound is individually separated, thus not to be aggregated together. Thus, the inorganic compound will not precipitate but move to an upper phase of the suspension. In this way, the fallen off inorganic compound and the precipitated amino resin composite particle can be centrifugally separated.

Note that the amino resin composite particle used in the fall-off test is an amino resin composite particle subjected in advance to filtration using a membrane filter of pore size of 1.0 µm so as to remove not adhered, that is, free particulates of the inorganic compound.

Here, the shear force application causes the not-firmly adhered particulates of the inorganic compound to fall off. Moreover, the centrifugal separation precipitates the amino resin composite particle. Thus, the measurement of the amount ($A_1$) of the fallen-off particulates of the inorganic compound indicates how much inorganic compound is firmly adhered on the surface of the amino resin composite particle, based on the quantity ($B_1$) of the inorganic compound, which is worked out from the content of the inorganic compound in the amino resin composite particle, using later described equation (1), thus giving the firm-adhering ratio. This method is called a centrifugal separation method.

The firm-adhering ratio of the present invention can be calculated by firstly applying a shear force to a suspension containing the amino resin composite particle so as to fall off the not-firmly adhered particulates of the inorganic compound, and secondly centrifugally separating the suspension subjected to the fall-off test. Specifically, the shear force is applied to the amino resin composite particle by mixing the suspension containing the amino resin composite particle. The amino resin composite particle used when applying the shear force has the solid content concentration of 10% based on the weight of the thus obtained suspension.

Moreover, as described later, the firm-adhering ratio can be calculated by a heat treatment method. More specifically, as in the fall-off test, a shear force is applied to the suspension containing the amino resin composite particle, so as to fall off the not-firmly adhered particulates of the inorganic compound. The suspension subjected to the fall-off test is filtered through a membrane filter having a pore size of 1.0 µm, so as to separate the not-firmly adhered inorganic compound from the suspension. Then, the amino resin compound is filtered out. After that, a filtrate resulted from the filtration is dehydrated. Further, organic material is burned out at 700° C. The amount ($A_2$) of the inorganic compound fallen off from the amino resin composite particle is calculated from residual ash. Besides, based on the amount ($B_2$) of the child particle, that is, the inorganic compound in the amino resin composite particle calculated separately, the firm-adhering ratio is calculated from the amount of the fall-off inorganic compound using the later described equation (2).

As described above, the firm-adhering ratio of the present invention can be calculated by applying the shear force onto the suspension of the amino resin composite particle so as to fall off the not-firmly adhered particulates of the inorganic compound, and filtering the suspension subjected to the fall-off test via the membrane filter having the pore size of 1.0 µm, and subjecting the filtrate to the heat treatment.

Firstly, the centrifugal separation method will be explained.

[Centrifugal Separation Method]

More specifically, the amino resin composite particle of the present invention is an amino resin composite particle in which the inorganic compound is firmly adhered on the surface of the amino resin particle, and whose adhering ratio is 10% or more and is measured by the following procedure: 250 g of a suspension containing 10% the amino resin composite particle by weight and the nonionic surfactant polyoxyl ethylene oleyl ether of 0.4% by weight (for example, "Emulgen 430" (Product Name) manufactured by KAO Corp.) are added in a container having a diameter of 92 mm; after applying a shear force by mixing at an impeller tip speed (a head peripheral velocity) of 5.2 m/s for 3 minutes by a high-speed dispersion mill at a revolution velocity of 2500 rpm, thereby applying a shear force, so as to obtain a suspension, where the high-speed dispersion mill has a blade size of 40 mm diameter ($\phi$), and a 10 mm height between a bottom of the beaker and a lowest part of the blades, the suspension was centrifugally separated by applying a centrifugal force of 1880 G (here, G indicates the gravity of a general meaning) for two minutes, thereby obtaining a supernatant liquid; 25 g of the supernatant liquid is evaporated at 110° C. for 30 minutes until it dries thereby obtaining a solid material; here, it is put that $A_1$ is a weight (g) of the inorganic compound fallen off from 25 g of the amino resin composite particle, worked out from a weight of the solid material obtained from 25 g of the supernatant liquid, and $B_1$ is a weight (g) of the inorganic compound in 25 g of the amino resin composite particle worked out from the content by percentage of the inorganic compound in the amino resin composite particle; $A_1$ and $B_1$ are substituted in the following equation (1) for calculation of the firm adhering ratio:

$$\text{Firm-adhering ratio (\%)} = (1 - A_1/B_1) \times 100 \tag{1}$$

Note that the suspension may be prepared by using the amino resin composite particle as later described in the examples. As a result of three-minute shear force application, the inorganic compound not firmly adhered will fall off from the amino resin composite particle, which does not have the adhering ratio of the present invention.

In the measurement, the nonionic surfactant is used so as to evenly disperse and stabilize the amino resin composite particle and the fallen-off inorganic compound (child particle) in water, and to facilitate the centrifugal separation of the amino resin composite particle (and the mother particle from which the inorganic compound (child particle) are fallen off) from the fallen-off inorganic compound (child particle).

Therefore, for example, when the amino resin composite particle having the mother particle and the child particle at a ratio of 4:1 by weight (the content by percentage of the child particle is 20% by weight) gives the supernatant liquid having a solid material quantity less than 2% by weight, the firm-adhering ratio of the child particle is 90% or more.

However, the method described above (hereinafter, the method is referred to as the centrifugal separation method) may have such a problem that during the firm-adhering ratio measurement the inorganic compound (child particle) fallen off but aggregated together, if any, may be centrifugally separated as well as the mother particle, giving the measurement of the firm-adhering ratio slightly higher than the actual value.

While the centrifugal separation method may be used for measuring the firm-adhering ratio of a child particle having such a comparatively small size that aggregation of the child particle tends to occur, the following method (which is referred to as the heat treatment method hereinafter) is more preferably used in the present invention.

Next, the heat treatment method will be explained below.

[Heat Treatment Method]

More specifically, the amino resin composite particle of the present invention is an amino resin composite particle in which the inorganic compound is firmly adhered on the surface of the amino resin particle, and whose adhering ratio is 10% or more and is measured by the following procedure: 250 g of a suspension containing 10% the amino resin composite particle by weight, and the nonionic surfactant polyoxyl ethylene oleyl ether of 0.4% by weight (for example, "Emulgen 430" (Product Name) manufactured by KAO Corp.), are added in a container having a diameter of 92 mm; after applying a shear force by mixing at an impeller tip speed (a head peripheral velocity) of 5.2 ms for 3 minutes by a high-speed dispersion mill at a revolution velocity of 2500 rpm, thereby applying a shear force, so as to obtain a suspension, where the high-speed dispersion mill has a blade size of 40 mm diameter ($\phi$), and a 10 mm height between a bottom of the beaker and a lowest part of the blades, the suspension is filtered under reduced pressure by using a filter having a pore size of 1.0 μm; Then, a filtrate resulted from the filtration is evaporated at 110° C. for 30 minutes until it dries thereby obtaining a solid material; then the solid material is heated in air atmosphere at 700° C. for one hour thereby obtaining an ash content; the ash content (g) is measured, here it is put that ($A_2$) is the quantity (g) of the inorganic compound fallen off from the 25 g of the amino resin composite particle, and ($B_2$) is a weight (g) of the inorganic compound in the 25 g of the amino resin composite particle, calculated out from the content by percentage of the inorganic compound in the amino resin composite particle; the $A_1$ and $B_1$ are substituted in the following equation (1) for calculation of the firm adhering ratio:

Firm-adhering ratio (%)=$(1-A_2/B_2)\times100$ (2),

Note that the content by percentage ($B_2$) of the inorganic compound in the amino resin composite particle in the equation (2) is obtained from the following equation (3):

Content by percentage (%)=$C/2\times100$ (3), where C is an ash content (C (g)) of a 2 g sample of the amino resin composite particle that has not been subjected to the shear force, and that is provided for the measurement of the firm-adhering ratio, the ash content being measured by heating the sample at 700° C. for one hour under an air atmosphere.

Note that again in the heat treatment method the suspension may be prepared by using the amino resin composite particle as later described in the examples. As a result of three-minute shear force application, the inorganic compound not firmly adhered will fall off from the amino resin composite particle, which does not have the adhering ratio of the present invention.

As to the suspension for use in the fall-off test, the dried amino resin composite particle may be used and suspended in the predetermined conditions, and be subjected to the shear force application, so as to perform the fall-off test. Alternatively, when the suspension containing the amino resin composite particle is used, its solid content concentration is adjusted and water and a surfactant are added excessively if necessary, or water is removed until the solid content concentration reaches a certain level. Then, the suspension is added into the container in the same manner, and subjected to the fall-off test by applying the shear force for three minutes at an impeller tip speed (a head peripheral velocity) of 5.2 m/s.

In addition, in the centrifugal separation method and the heat treatment method, the impeller tip speed (head peripheral velocity) of the impellers of the mixing apparatus) is calculated out by the following equation (4):

Impeller Tip Speed (m/s) of impellers=diameter of impellers (m)×π×number of times impellers rotate/60 (4).

Note that a ratio of a diameter of the container to the diameter of blades (a diameter of the container (mm) to the diameter of blades (mm)) is 2.3 times.

Note that in the present invention the amino resin composite particle is produced via the step of removing (separating) the amino resin composite particle from the reaction mixture, and the step of dehydrating the thus removed amino resin composite particle. Thus, the firm-adhering ratio is measured by the above-mentioned fall-off test in which the child particle (inorganic compound) is fallen off from the amino resin composite particle. Moreover, as to a composition, in which the amino resin composite particle and fine particulate compounds such as the inorganic compound are mixed together, the composition (mixture) is filtered via the membrane filter so as to separate the amino resin composite particle. After that, the firm-adhering ratio of the inorganic compound is measured by the fall-off test in which the heat treatment method is adopted. As the membrane used for separating the amino resin compound from the composition in which the amino resin composite particle and the fine particulate compounds such as the inorganic compound are mixed together, a membrane filter capable of separating the amino resin composite particle to be filtered out may be used, considering an average particle diameter and distribution of the composition.

Moreover, the amino resin composite particle of the present invention is particularly useful as a toner particle and an additive for toner, because the amino resin composite particle makes it possible to control the toner in terms of an electrostatic charge thereof. The electrostatic charge of the toner can be controlled arbitrarily by controlling a quantity of silica (inorganic compound) to be firmly adhered on the mother particle. For example, if the amino resin composite particle is set to have a blow-off electrostatic charge of −50 μC/g to +50 μC/g preferably, of −20 μC/g to +10 μC/g more preferably, it is possible to control the electrostatic charge of the toner arbitrarily, thereby improving the toner in terms of image development property, transcription property and the like properties.

Thus, it is one preferable embodiment of the amino resin composite particle of the present invention that the amino resin composite particle of the present invention is used in the toner particle or the additive for toner, or in a toner component.

As components (ingredients) of the additive for toner and the toner component, other than the amino resin composite particle, any component generally used in the additive for toner and the toner component may be used, as required. The ingredients may be pigment, dyes, dispersants, binder resin, surfactants, and coupling agents. Those ingredients have no particular limitation in terms of quantity to be added, and are added in arbitral quantities so that targeted properties will be given to the additive and toner component. However, the quantities of the ingredients to be added are preferably within a range of 1% by weight to 100% by weight, and more preferably within a range of 5% by weight to 100% by weight. It is possible to obtain an additive for toner or a toner component having a desired property by arbitrarily controlling the quantity of the amino resin composite particle and that of the ingredients.

As described above, the amino resin composite particle thus obtained by the producing method of the present invention has the firm-adhering ratio of 10% or more, that is, a fall-off rate of less than 90%. Therefore, for example, even if an external force is applied, the quantitative ratio of the inorganic compound (child particle) fallen off is smaller than that of a conventional amino resin composite particle. Moreover, the amino resin composite particle of the present invention has amino resin particle (mother particle) whose surface is improved by the inorganic compound (child particle) to have excellent solvent resistance, water resistance, heat resistance, and high hardness. Moreover, because the quantity of the inorganic compound (child particle) fallen off from the amino resin particle (mother particle) is small, the amino resin composite particle has a stable electrostatic charge property. Therefore, the amino resin composite particle can be suitably used as a flatting agent for paint, a light scattering agent, rheology control agent, a column packing filler, an IC filler, a coating agent for a film, an additive for wax, an antibody, a conductive particle, a cosmetic, a particle for toner, an additive for toner, and abrasive powder, and the like.

As described above, an amino resin composite particle of the present invention is an amino resin composite particle in which an inorganic compound is firmly adhered on a surface of the amino resin particle, the amino resin composite particle having a firm-adhering ratio of the inorganic compound of 10% or more, where the firm-adhering ratio is calculated out by measuring a quantity of an inorganic compound fallen off from the surface of the amino resin composite particle by mixing, at an impeller tip speed (a head peripheral velocity) of 5.2 m/s, a suspension containing as a solid content 10% the amino resin composite particle by weight.

The quantity of the inorganic compound thus fallen off is measured by a centrifugal separation method or a heat treatment method. In short, the amino resin composite particle of the present invention is, more specifically, an amino resin composite particle in which an inorganic compound is firmly adhered on a surface of the amino resin particle, the amino resin composite particle having a firm-adhering ratio of the inorganic compound of 10% or more, where the firm-adhering ratio is calculated out by a fall-off test for measuring, by a centrifugal separation method or a heat treatment method, a quantity of an inorganic compound fallen off from the surface of the amino resin composite particle by mixing, at an impeller tip speed (a head peripheral velocity) of 5.2 m/s, a suspension containing as a solid content 10% the amino resin composite particle by weight.

The amino resin composite particle of the present invention is preferably arranged such that the amino resin particle is a reactant of a reaction of an amino compound containing at least 40 wt % a compound selected from a group of benzoguanamine, cyclohexanecarboguanamine, cyclohexenecarboguanmanine, and melamine.

Further, the amino resin composite particle of the present invention is preferably arranged such that the inorganic compound is firmly adhered as a child particle on the amino resin as a mother particle. In short, it is preferable that the amino resin composite particle of the present invention is formed by fixing the child particle made of the inorganic compound on a surface of the mother particle of the amino resin particle, thereby having a firm-adhering ratio of the child particle of 10% or more.

Further, the amino resin composite particle of the present invention is preferably arranged such that the inorganic compound as the child compound has an average particle diameter 0.05 to 0.001 times that of the amino resin particle of the mother particle. In other words, the amino resin composite particle of the present invention is preferably arranged such that the inorganic compound is firmly adhered as a child particle on a surface of the amino resin particle as a mother particle wherein the inorganic compound as the child compound has a particle diameter 0.05 to 0.001 times that of the amino resin particle of the mother particle.

Moreover, it is preferable that the amino resin particle has an average particle diameter within a range of 1 μm to 30 μm, the inorganic compound has an average particle diameter within a range of 0.001 μm to 1.5 μm, and the average particle diameter of the mother particle is greater than that of the child particle.

In the arrangements, in the amino resin composite particle the inorganic compound, for example, the child particle made of the inorganic compound has the firm-adhering ratio of inorganic compound of 10% or more, that is, a fall-off ratio of 90% or less. Thus, for example, even if an external force is applied, the quantitative ratio of the inorganic compound (child particle) fallen off (the fall-off ratio) is smaller than that of a conventional amino resin composite particle. Thus, it is possible to provide an amino resin composite particle in which the inorganic compound is stably firmly adhered on the surface of the amino resin particle, for example, the amino resin composite particle in which the inorganic compound as the child particle is stably firmly adhered on the surface of the amino resin particle as the mother particle.

Yet further, a method of the present invention of producing an amino resin composite particle, the method firmly adhering an inorganic compound on a surface of an amino resin particle so at to produce the amino resin composite particle, includes a step of (a) mixing an aqueous dispersion, in the presence of an emulsifier, with a shear force application, so as to fix the inorganic compound, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be firmly adhered, and (II) an inorganic compound to adhere thereon, in such a manner that (I) the at least one of (XX) the amino resin precursor, (YY) the partially-hardened amino resin precursor, and (ZZ) the amino resin particle, and (II) the inorganic compound are dispersed in water.

One of modifications of the method is, for example, and arrangement in which the step (a) further includes the step of (d) hardening (XX) the amino resin precursor by adding a catalyst into the emulsion thus prepared in the step (c), so as to prepare a suspension of (YY) the partially-hardened amino resin precursor, where the step (a) mixes the aqueous dispersion, in the presence of the emulsifier, with the shear force application, the aqueous dispersion containing (I) (XX) an amino resin precursor to be the amino resin particle, and (II) the inorganic compound to adhere thereon, in such a manner that (I) (XX) the amino resin precursor, and (II) the inorganic compound are dispersed in water.

The method of producing the amino resin composite particle of the present invention is preferably arranged so as to include mixing the emulsifier within a range of 1% by weight to 30% by weight based on a weight of the amino resin precursor.

Moreover, the method of producing the amino resin composite particle of the present invention is preferably arranged such that the step (a) further includes the steps of (c) preparing an emulsion of (XX) the amino resin precursor to be the amino resin particle, by mixing an aqueous dispersion of (XX) the amino resin precursor, and an aqueous solution of the emulsifier; (e) mixing, with a shear force application, the emulsion of (XX) the amino resin precursor, and (II) the inorganic compound to adhere thereon.

Further, it is preferable that in the step (e) the inorganic compound is mixed with the emulsion while the inorganic compound is dispersed in water.

For example, a method of the present invention of producing an amino resin composite particle, the method firmly adhering an inorganic compound on a surface of an amino resin particle so at to produce the amino resin composite particle, induces the steps of mixing, with a shear force application, an aqueous dispersion of an inorganic compound to be a child particle, and an emulsion of an aqueous dispersion of an amino resin precursor to be a mother particle, and an aqueous solution of an emulsifier, so as to prepare an emulsion of them, and adding a catalyst to the emulsion so as to harden the amino resin precursor.

With this arrangement, (a) in the presence of an emulsifier, with a shear force application, (I) at least one of (XX) an amino resin precursor to be the amino resin particle, (YY) a partially-hardened amino resin precursor to be the amino resin particle, and (ZZ) an amino resin particle, on which the inorganic compound is to be firmly adhered, and (II) an inorganic compound to adhere thereon are mixed, while (I) the at least one of (XX) the amino resin precursor, (YY) the partially-hardened amino resin precursor, and (ZZ) the amino resin particle, and (II) the inorganic compound are dispersed in water, so as to emulsify or suspend them, thereby causing a surface of (I) the at least one of (XX) the amino resin precursor, (YY) the partially-hardened amino resin precursor, and (ZZ) the amino resin particle, to be soft, and thereby making it possible to fix (firmly adhere) the inorganic compound on the surface of those amino resin precursors and/or the amino resin particle, by means of the high shearing force. Thus, the method makes it possible to firmly fix (firmly adhere) the inorganic compound on the surface of those amino resin precursors and/or the amino resin particle, thereby easily and inexpensively providing such an amino resin composite particle that even if an external force is applied thereon, less inorganic compound (child particle) is fallen off.

Especially, with the present invention, in which, for example, the emulsion of the aqueous dispersion of the amino resin precursor to be a mother particle, and the aqueous solution of the emulsifier, and the inorganic compound to be the child particle are mixed with the shear force application so as to emulsify them, and then are hardened. Thus, it is possible to fix the child particle made of the inorganic compound on the surface of the mother particle of made of amino resin particle, without increasing a number of manufacturing steps, compared with a case where the coating of the surface is carried out. In other words, it is possible to fix the child particle on the surface of the mother particle easily and inexpensively. Moreover, because the mixing (emulsification) is carried out while a shear force is being applied (that is, with the shear force application), the child particle is firmly fixed on the mother particle, so that the child particle hardly falls off from the mother particle. With this arrangement, it is possible to easily and inexpensively produce the amino resin composite particle in which the child particle is firmly adhered on the surface of the mother particle.

Furthermore, as another modification of the method of the present invention of producing the amino resin composite particle, the method of the present invention may be so arranged that the step (a) further includes the steps of: (c) preparing an emulsion of (XX) the amino resin precursor to be the amino resin particle, by mixing an aqueous dispersion of (XX) the amino resin precursor, and an aqueous solution of the emulsifier; (d) hardening (XX) the amino resin precursor by adding a catalyst into the emulsion thus prepared in the step (c), so as to prepare a suspension of (YY) the partially-hardened amino resin precursor; and (e) mixing, with a shear force application, the suspension of (YY) the partially-hardened amino resin precursor, and (II) the inorganic compound to adhere thereon.

It is preferable that the step (a) further includes the step of, prior to the step (e): (f) further adding into the suspension of (YY) the partially-hardened amino resin precursor an aqueous solution of the emulsifier.

It is preferable that the step (a) further includes the step of, prior to the step (e): (g) adding into the suspension of (YY) the partially-hardened amino resin precursor an aqueous solution of formaldehyde.

Further, it is preferable that the step (a) further includes the step of: mixing the inorganic compound in the suspension of (YY) the partially-hardened amino resin precursor while the inorganic compound is dispersed in water.

Moreover, as yet another modification of the method of the present invention of producing the amino resin composite particle, the method of the present invention may be so arranged that the step (a) further including the steps of (c) preparing a suspension of (ZZ) the amino resin particle, by mixing an aqueous dispersion of (ZZ) the amino resin particle, and an aqueous solution of the emulsifier; and (e) mixing, with a shear force application, the suspension and (II) the inorganic compound to adhere thereon, where the step (a) mixes the aqueous dispersion, in the presence of the emulsifier, with the shear force application, the aqueous dispersion containing (I) (ZZ) the amino resin particle, and (II) the inorganic compound to adhere thereon, in such a manner that (I) (ZZ) the amino resin particle, and (II) the inorganic compound are dispersed in water.

The amino resin particle may be an amino resin particle sold on market, or may be prepared by hardening the amino resin precursor. Namely, the method of the present invention of producing amino resin composite particle may be so arranged so as to include the steps of, prior to the step (a):

(c) preparing an emulsion of (XX) the amino resin precursor to be the amino resin particle, by mixing an aqueous dispersion of (XX) the amino resin precursor, and an aqueous solution of the emulsifier; and (d) hardening (XX) the amino resin precursor by adding a catalyst into the emulsion thus prepared in the step (c), so as to prepare a suspension of (ZZ) the amino resin particle, the step (a) further including: (f') further adding into the suspension of (ZZ) the thus prepared amino resin particle an aqueous solution of the emulsifier; and (e') mixing, with a shear force application, the suspension and (II) the inorganic compound to adhere thereon, where the step (a) mixes the aqueous dispersion, in the presence of the emulsifier, with the shear force application, the aqueous dispersion containing (I) (ZZ) the amino resin particle, and (II) the inorganic compound to adhere thereon, in such a manner that (I) (ZZ) the amino resin particle, and (II) the inorganic compound are dispersed in water.

It is preferable that the step (a) further includes the step of, prior to the step (e): (g) adding into the suspension of (ZZ) the amino resin particle an aqueous solution of formaldehyde. Further, it is preferable that in the step (e) the inorganic compound is mixed in the suspension while the inorganic compound is dispersed in water.

In short, depending on which type of the inorganic is used, the addition of the inorganic compound when emulsifying the amino resin precursor (that is, when emulsifying the amino resin precursor in the presence of the emulsifier) may destroy the emulsified particulates of the amino resin precursor, thereby causing aggregation of the destroyed emulsified particle of the amino resin precursor. Therefore, in case this are such risks, it is preferable that after the amino resin precursor is partially or wholly hardened, then the inorganic compound is fixed (firmly adhered) on the amino resin particle, that is, the mother particle. However, in this case, it is difficult to adhere the inorganic compound on the amino resin particle or the amino resin precursor to be the mother particle, which is hardened by the hardening reaction. To overcome this, the aqueous dispersion may be suspended in the presence of the emulsifier so as to form a soft layer, so that the inorganic compound is adhered (fixed) onto the soft layer. In that case, formaldehyde is added, for example as an aqueous solution of formaldehyde, so as to perform the suspending, thereby chemically bonding the later formed soft layer and the surface of the mother particle as a result of the suspending. In this way, it is possible to prevent the later formed soft layer from being peeled off, thereby obtaining an amino resin composite particle having a high firm-adhering ratio. With the present invention, in this case again it is possible to obtain the amino resin composite particle on which the child particle made of the inorganic compound is fixed on the surface of the mother particle made of the amino resin particle.

Moreover, it is preferable that the inorganic compound is in a particle form and the child particle made of the inorganic compound is fixed on the surface of the mother particle.

Moreover, in the present invention, the shearing force is applied by using a blade revolving at an impeller tip speed (a head peripheral velocity) in a range between 2 m/s and 30 m/s, so as to shear, in the presence of an emulsifier, (I) the at least one of (XX) the amino resin precursor, (YY) the partially-hardened amino resin precursor, and (ZZ) the amino resin particle, and (II) the inorganic compound, while (I) the at least one of (XX) the amino resin precursor, (YY) the partially-hardened amino resin precursor, and (ZZ) the amino resin particle, and (II) the inorganic compound are dispersed in water. Alternatively, in the present invention, the shearing force is applied to mix the aqueous dispersion, by colliding against each other at a discharging pressure between 3 MPa and 49 MPa, in the presence of an emulsifier, (I) the at least one of (XX) the amino resin precursor, (YY) the partially-hardened amino resin precursor, and (ZZ) the amino resin particle, and the inorganic compound, while (I) the at least one of (XX) the amino resin precursor, (YY) the partially-hardened amino resin precursor, and (ZZ) the amino resin particle, and (II) the inorganic compound are dispersed in water. Further alternatively, in the present invention, the shearing force is applied by introducing or forcibly circulating, at a discharging pressure of 0.1 Mpa to 1.47 Mpa, in a bath tank of a mixing apparatus, the bath tank being provided with a baffle plate for turning a flow direction by 90 degrees, while (I) the at least one of (XX) the amino resin precursor, (YY) the partially-hardened amino resin precursorand (ZZ) the amino resin particle, and (II) the inorganic compound are dispersed in water.

Second Embodiment

The first embodiment describes the amino resin composite particle in which the inorganic compound is firmly adhered on the amino resin particle (amino resin bridged particle) as the nuclear particle (mother particle), and the method of producing the amino resin composite particle inexpensively and easily.

A present embodiment described a method of producing, stably, inexpensively and easily, an amino resin particle (amino resin bridged particle) as a nuclear particle (mother particle), and an amino resin composite particle whose nuclear particle (mother particle) is the amino resin particle. Namely, the present embodiment describes, in the following, the method of producing the amino resin particle (amino resin bridged particle), which has excellent economical efficiency and productivity, and is capable of efficiently preventing destruction of emulsified particulates of an amino resin precursor during hardening reaction after emulsification of the amino resin precursor, as well as a method of the amino resin composite particle using the method of producing the amino resin particle, that is, a method of producing the amino resin composite particle, which has excellent economical efficiency and productivity, and is capable of efficiently preventing destruction of emulsified particulates of an amino resin precursor during hardening reaction after emulsification of the amino resin precursor, when the inorganic compound is firmly adhered onto the surface of the amino resin particle as described above.

Especially, for the production of an amino resin particle of a small particle diameter (especially, an amino resin particle having an average particle diameter of 5 μm or less), emulsification requires stirring blades or the like to have a higher shearing force for mixing the emulsified particulates composed of the amino resin precursor to be the amino resin particle, so as to attain the small particle diameter. Therefore, considering both the economical efficiency and the productivity, the emulsification of the amino resin precursor is carried out with an emulsification concentration (concentration of the amino resin precursor with which the emulsification is carried out) as high as possible, and an emulsification temperature (a temperature at which the emulsification is carried out) higher than emulsification temperature for obtaining other types of amino resin particles. In case the emulsification concentration is low, it is necessary to use a mixing apparatus having a large mixing power and use it at a high-speed revolution for a sufficiently high shearing force, thereby failing to achieve a good economical efficiency, and thereby yielding a smaller amount of particle from a given emulsion, thus failing to achieve a good productivity.

Moreover, in a general practice, the hardening reaction is carried out at an elevated temperature, by first cooling the reaction mixture to a temperature suitable for starting the hardening reaction, and then starting the hardening reaction while gradually elevating the temperature. In this manner, the amino resin precursor thus emulsified is more evenly hardened wholly, that is, from its inside to surface, so as to be homogeneous bridged particle.

However, when the emulsification and the hardening are carried out in the conditions explained above, it is necessary to cool the temperature of the emulsion thus obtained after emulsification to the temperature suitable for starting the hardening reaction. This causes a sudden increase of viscosity of the emulsion, which may destroy the emulsified amino resin precursor (emulsified particle), or cause aggregation of the emulsified particle that causes a significant unevenness in a particle size distribution.

Especially, in case an amino resin particle having a particle size as small as possible is desired, the emulsion temperature is increased so that the shear force given by the mixing device or the like will be more effective, in order to produce the amino resin particle having such a small particle size. Thus, the above problem is significant.

Thus, the inventors of the present application carried out intensive studies so as to solve the above problem. As a result, the inventors found out that after the emulsion was obtained at a high emulsion temperature and a high emulsion concentration, and before starting the hardening reaction, water may be added in the emulsion to dilute the emulsion so as to improve the economical efficiency and the productivity, and this arrangement effectively prevents the destruction of the emulsified particle during the hardening reaction after the emulsification of the amino resin precursor. The present invention has been accomplished by checking the above problem was solved by adding water in the emulsion to dilute the emulsion before starting the hardening reaction. Furthermore, the addition of water not only dilutes the thus obtained emulsion but also reduces a temperature thereof at the same time. This makes it easier to set the temperature conditions to be suitable for the hardening reaction, whereby the temperature can be set by using a cooling apparatus as less as possible, thereby improving the economical efficiency and the like.

Namely, the method of producing the amino resin particle (amino resin bridged particle) of the present embodiment, which includes the steps of reacting an amino compound with formaldehyde so as to obtain an amino resin precursor; emulsifying the amino resin precursor; and adding a catalyst to the emulsion so as to harden the amino resin precursor to be the amino resin particle, includes, prior to the adding the catalyst, a step of adding water in the emulsion to dilute the emulsion.

In short, in the present embodiment, the catalyst (hardening catalyst) is added after the emulsion is diluted by adding water to the emulsion, which is obtained by emulsifying the amino resin precursor. More specifically, the hardening step is carried out after diluting the emulsion of the amino resin precursor by adding water therein, the emulsion being obtained by the emulsification step (step (c) or (c')). In addition, without diluting the emulsion with water, an application of the suspension polymerization method to obtain such amino resin particle having a small particle diameter is not economical, because it is necessary to lower the concentration of the emulsion and to shear the emulsified particle by mixing the emulsion at a high-speed revolution by a mixing apparatus having a large power.

There is no particular limitation in terms of a quantity of water to be added in the emulsion of the amino resin precursor. However, specifically, the quantity dilutes the emulsion preferably to a concentration of the amino resin precursor of 45% by weight, more preferably to a concentration of the amino resin precursor of 40% by weight, further preferably to a concentration of the amino resin precursor in a range 10% by weight to 35% by weight. By specifying the quantity of water to be added in the emulsion as such, it is possible to attain the aforementioned object easily.

In the present invention, the water is added for diluting the emulsion for example. However, if water at a normal temperature is used as the water for diluting, it is also possible to lower the temperature of the emulsion while diluting it. Thus, where it is necessary to decrease the temperature of the emulsion before the hardening reaction, this decreases the temperature easily before the reaction, thereby eliminating or reducing the use of the conventional and known cooling apparatuses to lower the temperature of the emulsion. This further improves the economical efficiency and the production.

The quantity of water to be added may be appropriately set to a predetermined temperature, in case it is necessary to start the hardening reaction at the temperature.

Specifically, the temperature of the water to be added in the emulsion, which is not particularly limited, is preferably in a range of 5° C. to 80° C., more preferably in a range of 10° C. to 60° C., more preferably in a range of 10° C. to 50° C. The temperature of the emulsion can be easily lowered to the targeted temperature by using water in the temperature ranges.

Here, timing at which the water is added to the emulsion in the present invention is discussed. In the present invention, the emulsion to which the water is added may be an emulsion in which at least some of the particulates of the amino resin precursor are emulsified in a phase in which the amino resin precursor is emulsified, or may be an emulsion in which the amino resin precursor is completely emulsified. However, for preventing the emulsified particle from being destructed, it is preferable that the water is added to the emulsion in which the amino resin precursor has been emulsified so as to attain the targeted range of the particle diameter in the step of the emulsification (step (c) or (c')). The average particle diameter of the emulsified amino resin precursor (average particle diameter of the amino resin precursor dispersed in the emulsion thus obtained by the emulsification) is measured by using the Coulter multisizer type II recited in examples that are described later. The present invention further includes the step of adding water to the thus obtained emulsion so as to dilute the emulsion. Moreover, in the present invention, the average particle diameter of the emulsified amino resin precursor (average particle diameter of the amino resin precursor dispersed in the emulsion thus obtained by the emulsification) is used to indicate in which state the emulsion thus obtained by the step of emulsification is prior to the dilution. In the step of diluting the emulsion by adding water therein after the emulsification in the present invention, the water is added to the emulsion at a timing at which the average amino resin precursor attains an average particle diameter preferably of 0.1 µm to 30 µm, more preferably of 0.5 µm to 25 µm, further preferably of 0.5 µm to 20 µm. Moreover, as to the temperature of the emulsion at which the water is added to the emulsion, the emulsion is at a temperature preferably between the temperature of the emulsification of the amino resin precursor and a temperature lower than that temperature by 30° C., more preferably between the temperature of the emulsification of the amino resin precursor and a temperature lower than that temperature by 20° C., and further preferably between the temperature of the emulsification of the amino resin precursor and a temperature lower than that temperature by 10° C. In short, it is preferable that the water is added to the emulsion so as to dilute the emulsion before the temperature of the emulsion decreases too much. After the emulsification, if cooling of the emulsion was carried out when the emulsion concentration was still high, it would result in aggregation or the like, thus failing to attain a particle having the targeted average particle diameter.

The water may be added to the emulsion, at once, continuously, or intermittently a bit at a time. Furthermore, when an additive or the like (such as the inorganic compound) is added to the emulsion, the additive and the water may be added to the emulsion at the same time.

The method of the present invention of adding the water to the emulsion thus obtained by the emulsification of the amino resin precursor so that the emulsion will be diluted, and adding the catalyst after the dilution is suitably applied to a case where the emulsification concentration (the concentration of amino resin precursor) is 45% by weight or more, more preferably in a range of 45% by weight to 60% by weight, and further preferably in a range of 50% by weight to 60% by weight. Moreover, the method of the present invention of adding water to the emulsion thus obtained by the emulsification of the amino resin precursor so that the emulsion will be diluted, and adding the catalyst after the dilution is suitably applied to the production of the amino resin bridged particle that has an average particle diameter of 0.1 µm to 10 µm, more preferably to the production of the amino resin bridged particle that has an average particle diameter of 0.1 µm to 8 µm, further preferably to the production of the amino resin bridged particle that has an average particle diameter of 0.1 µm to 5 µm.

According to the method, the amino resin particle (amino resin bridged particle) having a comparatively small particle diameter, for example, the amino resin particle having an average particle diameter of 0.05 µm to 30 µm, can be produced stably, easily and inexpensively. The amino resin particle has an average particle diameter preferably in a range of 0.1 µm to 30 µm, in a range of 0.5 µm to 25 µm, further preferably in a range of 0.5 µm to 20 µm. Thus, according to the method, the amino resin particle (amino resin bridged particle) used as the nuclear particle (mother particle) in the present invention can be produced stably, easily, and inexpensively.

Moreover, during the step of firmly adhering the inorganic compound on the surface of the amino resin particle during which the emulsion of the amino resin precursor and the inorganic compound are mixed to be the emulsion and harden, the addition of water to the emulsion thus obtained by emulsifying the amino resin precursor effectively prevent the destruction of the emulsified particle, thereby stably, inexpensively and easily providing the amino resin composite particle of the present invention.

Moreover, a preferable average particle diameter of the mother particle of the amino resin composite particle of the above method is the same as that of the first embodiment. Specifically, the mother particle has an average particle diameter preferably of 1 µm to 30 µm, more preferably, of 2 µm to 20 µm, especially preferably of 3 µm to 15 µm.

In other words, according to the present invention, it is possible to easily attain the aforementioned object by mixing an aqueous dispersion, in the presence of the emulsifier, with the shear force application, the aqueous dispersion containing the amino resin precursor to be the amino resin particle, and the inorganic compound to be firmly adhered thereon, in such a manner that the amino resin and the inorganic compound are dispersed in water, so as to obtain the emulsion of the amino resin precursor (step (a)), and then by adding water to the emulsion of the amino resin precursor so as to dilute it, and then by adding the catalyst so as to harden the amino resin precursor. Conditions for the dilution is as described above.

The following examples describe the present invention in more details. However, the present invention is not limited to the examples. Oil absorption (ml/100 g), particle resistance ($\Omega \cdot cm$), electrostatic charge (µC/g) and average particle diameter (µm) recited in the examples were measured in the following methods.

[Oil Absorption]

For measuring the oil absorption of amino resin composite particle, the measuring method of oil absorption recited in JIS K 5101 "Pigment Test Methods" was adopted.

[Particle Resistance]

For measuring the particle resistance of the amino resin composite particle after the inorganic compound is fallen off, adopted was the resistivity measuring method in which four-terminal method is applied, recited in Chemical Experiments 9 Electricity & Magnetism 4th edition (Publisher: Maruzen Co., Ltd.). Samples for the measurement were prepared as follows. Firstly, the amino resin composite particle was fed into a predetermined cell (having a size of 4 cm long, 4 cm wide and 1 cm high) to fill it up. Tapping motion was applied to fill up the cell with the particle. The cell was provided with one electrode at a bottom and two electrodes in a center thereof. Next, a lid provided with an electrode was attached on the cell, thereby completing the preparation of the sample. The electrode at the bottom and that of the lid were current supplying terminals, and that in the center was a voltage-measuring terminal. From one current supplying terminal to the other, a constant current was passed by using a DC constant voltage power supply, so as to measure a potential difference between the voltage measuring terminals by a voltmeter (conditions of the measurement: temperature 20° C.; relative humidity 20%). Then, the particle resistance of the amino resin composite particle was calculated from the current value, a distance between the voltage measuring terminals, and the potential difference.

Note that, used as the amino resin composite particle for the measurement of the particle resistance was the amino resin composite particle subjected to the fall-off test and dried thereafter.

The amino resin composite particle of the present invention has a particle resistance preferably of $1.0 \times 10^9$ $\Omega \cdot cm$ or less, more preferably of $1.0 \times 10^8$ $\Omega \cdot cm$ or less, and further preferably of $1.0 \times 10^7$ $\Omega \cdot cm$ or less.

The amino resin composite particle having a low particle resistance is suitable for use as a conductive filling agent for conductive plastics and conductive paints.

[Electrostatic Charge]

The suction blow-off method was adopted to measure the electrostatic charge of an amino resin composite particle. Firstly, 1.15 g of the amino resin composite particle and 28.95 g of iron oxide powder (manufactured by Dowa Iron Powder Co., Ltd; Product Name: DSP-128) were placed in a polyethylene vessel. Then, the amino resin composite particle was electrified by stirring the mixture in the vessel for 30 seconds by using a paint shaker (manufactured by Toyoseiki Co., Ltd.). The stirring the amino resin composite particle and the iron oxide powder electrified the amino resin composite particle positively, and the iron oxide powder negatively. Because of the electrification, the amino resin composite particle adhered to a surface of the iron oxide powder. The mixture was transferred to a predetermined cell having a meshed bottom. Pressure blow and suction were applied on the mixture in the cell at the same time, so as to remove the amino resin composite particle adhered on the iron oxide powder. 1.0 g of the iron oxide powder from which the amino resin composite particle was removed, was measured for residue electric charge, by using a suction blow-off device (manufactured by Toshiba Chemical Co., Ltd.). The electrostatic charge of the amino resin composite particle was worked out from the residue electric charge.

Note that, used as the amino resin composite particle for the measurement of the electrostatic charge was the amino resin composite particle subjected to the fall-off test and dried thereafter.

Among a mixer, a mixing device, and a mixing apparatus used in the following examples and comparative examples, the mixing apparatus was a mixing apparatus having a high shearing force, which was for use in mixing a reaction mixture (aqueous dispersion) that contains at least one of an emulsion of the amino resin precursor, an amino resin precursor whose amino resin had not yet been hardened, amino resin particle (amino resin bridge particle) whose amino resin had been hardened, and an inorganic compound to be fixed on, for example, an aqueous dispersion of the inorganic compound to be child particle, so as to fix the inorganic compound on the amino resin particle.

Moreover, the mixer and the mixing device were used for preparing and mixing the reaction mixture other than in the above step in which the mixing apparatus was used. Specifically, the mixer is used for preparing the amino resin precursor and for condensing and hardening the emulsion of the amino resin precursor, while the mixing device is used for emulsifying the amino resin precursor in the present of an emulsifier (such as polyvinyl alcohol).

[Average Particle Diameter]

An average particle diameter of the amino resin precursor (an average particle diameter of the amino resin precursor dispersed in the emulsion prepared by the emulsification), and that of the amino resin composite particle, which is the target product, was measured by using Coulter multisizer II described in the later described Examples.

Note that the firm-adhering ratio was calculated out by the fall-off test using one of the centrifugal separation method and the heat treatment method. Note that the amino resin composite particle used in the fall-off test is an amino resin composite particle subjected in advance to filtration using a membrane filter of pore size of 1.0 μm so as to remove not adhered, that is, free particulates of the inorganic compound.

[Centrifugal Separation Method]

To being with, 25 g of amino resin composite particle, 224 g of pure water, and 1 g of an aqueous solution of a nonionic surfactant of 5% by weight as a dispersion auxiliary agent (manufactured by KAO Corp.; Product Name: Emulgen 430), were added into a beaker of 500 ml volume (diameter ($\phi$): 92 mm), then mixed (stirred) for 3 minutes by using a high-speed dispersion mill at a revolution velocity of 2500 rpm, thereby applying a shear force, so as to obtain a suspension, where the high-speed dispersion mill had a impeller size of 40 mm diameter ($\phi$), and a 10 mm height between a bottom of the beaker and a lowest part of the impellers.

In this way, the shear force was applied onto the suspension containing as a solid content 10% the amino resin composite particle by weight, thereby falling off the inorganic compound not firmly adhered. In the mixing conditions described above, the shear force was applied by mixing at the impeller tip speed (head peripheral velocity) of 5.2 m/s.

Next, 12.5 g of the suspension was poured into each of four centrifugal tubes having 15 ml volume and 11.5 cm length, and then centrifuged by means of a table-top type mini centrifugal separator (manufactured by Nichion Medical and Scientific Instruments Manf. Co., Ltd.; Product Name: NT-4) for two minutes at a revolution velocity of 4100 rpm (centrifugal force 1880 G), so as to precipitate the amino resin composite particle. Note that a different type of centrifugal separating machine may be used for the centrifugal separation in equivalent conditions by setting the machine to have an appropriate centrifugal force. 25 g of supernatant liquid in the tubes was collected in an aluminum cup. The supernatant liquid was dehydrated so as to obtain solid material to be measured. The measurement of the solid contents gave the solid material quantity. From the solid material quantity, worked out was a ratio of the inorganic compound (child particle) fallen off from the amino resin composite particle. The firm-adhering ratio was calculated out by the following equation (1):

$$\text{Firm-adhering ratio (\%)} = (1 - A_1/B_1) \times 100 \qquad (1),$$

where $A_1$ is a weight (g) of the inorganic compound (child particle) fallen off from 25 g of the amino resin composite particle, worked out from a weight of the solid material obtained from 25 g of the supernatant liquid, and $B_1$ is a weight (g) of the inorganic compound (child particle) in 25 g of the amino resin composite particle worked out from the content by percentage of the inorganic compound in the amino resin composite particle.

[Heat Treatment Method]

To begin with, 25 g of the amino resin composite particle, 224 g of pure water, and 1 g of the nonionic surfactant of 5% by weight as a dispersion auxiliary agent (manufactured by KAO Corp.; Product Name Emulgen 430), are added into a beaker of 500 ml volume (diameter ($\phi$): 92 mm), and severely mixed for 3 minutes by a high-speed dispersion mill at a revolution velocity of 2500 rpm, thereby applying a shear force, so as to obtain a suspension, where the high-speed dispersion mill has a blade size of 40 mm diameter ($\phi$), and a 10 mm height between a bottom of the beaker and a lowest part of the blades.

In this way, the shear force was applied onto the suspension containing as a solid content 10% the amino resin composite particle by weight, thereby falling off the inorganic compound not firmly adhered. In the mixing conditions described above, the shear force was applied by mixing at the impeller tip speed (head peripheral velocity) of 5.2 m/s.

Next, the suspension is filtered under reduced pressure by using a membrane filter (manufactured by Toyo filter paper Co., Ltd.: pore size: 1.0 μm material: cellulosic ester).

Thus obtained filtrate is collected in an aluminum cup, and dehydrated to obtain a solid material. The solid content is transferred to a crucible, and then heated in an electric furnace in air atmosphere at 700° C. for one hour. After the solid material in the crucible is allowed to cool down, an ash content is measured. From the ash content, a ratio of the inorganic compound (child particle) fallen off from the amino resin composite particle is worked out, so as to substitute the ratio in the following equation (2) for calculating out the firm-adhering ratio:

$$\text{Firm-adhering ratio (\%)} = (1 - A_2/B_2) \times 100 \quad (2)$$

where $A_2$ is an quantity (g) of the inorganic compound (child particle) fallen off from the amino resin composite particle, and $B_2$ is a quantity (g) of the inorganic compound (child particle) in the amino resin composite particle of 25 g, $B_2$ being worked out from a content by percentage of the inorganic compound (child particle) in the amino resin composite particle.

Note that the content by percentage ($B_2$) of the inorganic compound in the amino resin composite particle in the equation (2) is obtained from the following equation (3):

$$\text{Content by percentage (\%)} = C/2 \times 100 \quad (3)$$

where C is an ash content (C (g)) of a 2 g sample of the amino resin composite particle that has not been subjected to the shear force, and that is provided for the measurement of the firm-adhering ratio, the ash content being measured by heating the sample at 700° C. for one hour under an air atmosphere.

EXAMPLE 1

3250.0 g (17.4 mole) of benzoguanamine as an amino compound, 2818.3 g (equivalent to 34.8 mole of formaldehyde) of formalin having a concentration of 37% by weight, 10 g (equivalent to 0.01 of sodium carbonate) of an aqueous solution of sodium carbonate of 10% by weight, were added into a 10 L-volumed reaction vessel provided with a reflux condenser, a mixer, a thermometer, an oscillating viscometer (made by MIVI ITS Japan Co., Ltd; Product Name MIVI 6001) and the like, so as to obtain a reaction mixture. Then, the reaction mixture thus prepared was heated with a stir so as to be reacted at a temperature of 95° C. to 97° C.

The reaction was continued until the reaction mixture attained a viscosity of $4 \times 10^{-2}$ Pa·s (40 cP), thereby obtaining the reaction mixture (an aqueous dispersion of the amino resin precursor), which was an initial condensate of benzoguanamine and formaldehyde. The viscosity was measured by using a process viscometer provided to the reaction vessel.

Then, an aqueous solution of polyvinyl alcohol, prepared by dissolving 100 g of polyvinyl alcohol (supplied by Kuraray Co., Ltd; Product Name PVA205) as the emulsifier in 7000 g of water, was added into a 25 L-volumed reaction vessel provided with a reflux condenser, a thermometer and the TK homomixer (made by Tokushu Kika Kogyo Co., Ltd.), and the like. The TK homomixer worked as the mixing device for use in emulsifying the reaction mixture containing the amino resin precursor, and the mixing apparatus having a high shear force for use in firmly adhering child particle composed of the inorganic compound onto the amino resin particulates as mother particle. Then, the aqueous solution was heated up to 75° C. with a stir. Then, the reaction mixture was added into the reaction vessel. After the addition, emulsification of the amino resin precursor was carried out while severely stirring the content at a revolution velocity of 7000 rpm by using the mixing apparatus having a high shear force, while the temperature was heated to 77° C. and maintained. Then, added in the reaction vessel were the emulsion of the amino resin precursor, and 1480 g of an aqueous dispersion of super colloid #16 (Product Name; a conductive carbon supplied by Nippon graphite Co., Ltd, having a primary particle diameter of 0.3 µm) having solid content concentration of 22% by weight as the aqueous dispersion of the inorganic compound. After that, the content of the reaction vessel was severely mixed for 5 minutes at a revolution velocity of 7000 rpm by using the TK homomixer, which was the mixing apparatus having the same high shear force, while keeping the temperature at 77° C. Therefore, based on the weight of the amino resin precursor the quantity of the inorganic compound used was 8% by weight. In this way, obtained was the emulsion containing the amino resin precursor having a concentration of 38.6% by weight. Into the thus obtained emulsion, 1200 g of pure water was added, and cooled down to a temperature of 30° C.

Next, an aqueous solution of dodecyl benzene sulfonic acid in which 80 g of dodecyl benzene sulfonic acid as a catalyst was dissolved in 1500 g of pure water was added into the emulsion. Then, the emulsion was heated up to 90° C. at a rate of 10° C. per hour with a stir. When reached 90° C., the temperature was maintained for one hour so that the amino resin precursor and/or the amino resin particle (amino resin bridge particle) on which the inorganic compound was fixed was condensed and hardened. Thus, the reaction (hardening) had a reaction (hardening) time of 7 hours in total.

After hardening, the amino resin composite particle (amino resin bridge composite coated particle) of the present invention was separated from the reaction mixture by filtration. The amino resin composite particle thus separated was subjected to a heat treatment at 130° C. for 3 hours. After that, the amino resin composite particle was ground in a mortar by gently pestling with a pestle, thereby obtaining the amino resin composite particle in a form of black powder. The amino resin composite particle was measured by using a multi-sizer (made by Coulter Co., Ltd; Coulter multisizer type II). The measurement showed that the amino resin composite particle had an average particle diameter (d50) of 9.1 µm, and the standard deviation of the average particle diameter was 4.8 µm. Similarly, an average particle diameter of the amino resin particle (amino resin bridged particle (mother particle)) was measured. The measurement showed that the amino resin particle (amino resin bridged particle) had an average particle diameter of 6.5 µm. The centrifugal separation method showed that the firm-adhering ratio of the amino resin particle (amino resin bridged particle) was 96%, while the heat treatment method showed that it was 94%. The amino resin particle (amino resin bridged particle) had: oil absorption of 150 ml/100 g, particle resistance of $7.5 \times 10^5$ Ω·cm, an electrostatic charge of −8.0 µC/g. Those results are listed in Table 1.

EXAMPLE 2

The same reaction and procedure as Example 1 were carried out, apart from that in replacement of the TK homomixer the TK lab dispersion mill (Product Name; supplied by Tokushu Kika Kogyo Co., Ltd., Japan) was used as the mixing apparatus having a high shearing force for mixing an emulsion of an amino resin precursor with an aqueous dispersion of an inorganic compound after the emulsion of the amino resin precursor was obtained by using the TK homomixer as the mixing device. As a result, obtained was an amino resin composite particle in a form of black powder. Results of measurements of various properties of the amino resin composite particle are listed in Table 1.

EXAMPLE 3

The same reaction and procedure as Example 1 were carried out, apart from that in replacement of the TK homomixer the EBARA milder (made by EBARA Manf. Co., Ltd., Japan) was used as the mixing apparatus having a high shearing force for mixing an emulsion of an amino resin precursor with an aqueous dispersion of an inorganic compound after the emulsion of the amino resin precursor was obtained by using the TK homomixer as the mixing device. As a result, obtained was an amino resin composite particle in a form of black powder. Results of measurements of various properties of the amino resin composite particle are listed in Table 1.

EXAMPLE 4

The same reaction and procedure as Example 1 were carried out, apart from that in replacement of the TK homomixer the High pressure homogenizer (made by Izumi Food Machinery Co., Ltd.) was used as the mixing apparatus having a high shearing force for mixing an emulsion of an amino resin precursor with an aqueous dispersion of an inorganic compound, its discharging pressure being set to 6.86 MPa (70 kgf/cm$^2$), after the emulsion of the amino resin precursor was obtained by using the TK homomixer as the mixing device. As a result, obtained was an amino resin composite particle in a form of black powder. Results of measurements of various properties of the amino resin composite particle are listed in Table 1.

EXAMPLE 5

The same reaction and procedure as Example 1 were carried out, apart from that in replacement of the TK homomixer the static mixer (made by Noritake Company Limited) was used as the mixing apparatus having a high shearing force for mixing an emulsion of an amino resin precursor with an aqueous dispersion of an inorganic compound, its discharging pressure being set to 0.98 MPa (10 kgf/cm$^2$) after the emulsion of the amino resin precursor was obtained by using the TK homomixer as a mixing device. As a result, obtained was an amino resin composite particle in a form of black powder. Results of measurements of various properties of the amino resin composite particle are listed in Table 1.

EXAMPLE 6

The same reaction and procedure as Example 1 were carried out, apart from that 3256 g of an aqueous dispersion of an AEROSIL 200 (Product Name; silica supplied by Nippon Aerosil Co., Ltd., having a primary particle diameter of 0.01 μm) having a solid content concentration of 10% by weight as the aqueous dispersion of the inorganic compound was used. As a result, obtained was an amino resin composite particle in a form of white powder. The quantity of the inorganic compound used was 8% by weight based on the weight of the amino resin precursor. Results of measurements of various properties of the amino resin composite particle are listed in Table 2. Moreover, electron microscope photographs (×7500) are shown in FIGS. 1 and 2.

EXAMPLE 7

The same reaction and procedure as Example 1 were carried out, apart from that 2900 g of an aqueous dispersion of the AEROSIL 200 (used in Example 6) having a solid content concentration of 10% by weight as the aqueous dispersion of the inorganic compound was used, and that an emulsion of an amino resin precursor was cooled down to a temperature of 25° C., and the EBARA milder (manufactured by Ebara manf. Co., Ltd) was used as the mixing device for emulsifying the reaction mixture containing the amino resin precursor, and as the mixing apparatus having the high shearing force for firmly adhering the child particle made of the inorganic compound onto the amino resin particle as the mother particle. As a result, obtained was an amino resin composite particle in a form of white powder. In short, in the present Example, the EBARA milder was used as the mixing device and the mixing apparatus so as to emulsify the mixture of the amino resin precursor and the emulsifier at a revolution velocity of 5000 rpm, so as to obtain an emulsion. The emulsion was cooled down to the temperature of 25° C. Thereafter, 2900 g of an aqueous dispersion of the AEROSIL 200 having a solid content concentration of 10% by weight, as an aqueous dispersion of the inorganic compound was added into the reaction vessel. At the same time, the content of the reaction vessel was mixed by using the EBARA milder at a revolution velocity of 5000 rpm. Here, the quantity of the inorganic compound used was 7% by weight based on the weight of the amino resin precursor. Results of measurements of various properties of the amino resin composite particle are listed in Table 2.

Furthermore, the thus obtained amino resin composite particle was subjected to mapping of silica Kα (2000×) on an X-ray micro analyzer (manufactured by Shimadzu Corp; Product Name: EPMA-1610), in order to check how firmly silica (child particle) was adhered in the amino resin composite particle. The mapping showed that aluminum was firmly adhered on the amino resin particle.

COMPARATIVE EXAMPLE 1

The same reaction and procedure as Example 1 were carried out, apart from that in replacement of the TK homomixer a general four-paddle mixer was used as the mixing apparatus having a high shearing force for mixing an emulsion of an amino resin precursor with an aqueous dispersion of an inorganic compound, its revolution velocity being set to 200 rpm after the emulsion of the amino resin precursor was obtained by using the TK homomixer as the mixing device. As a result, obtained was an amino resin composite particle in a form of black powder. Results of measurements of various properties of the comparative amino resin composite particle are listed in Table 2.

COMPARATIVE EXAMPLE 2

The same reaction and procedure as Example 1 were carried out, apart from (α) that 2900 g of an aqueous dispersion of the AEROSIL 200 (used above) having a solid content concentration of 10% by weight as the aqueous dispersion of the inorganic compound was used, and (β) that in replacement of the TK homomixer the general four-paddle mixer was used as the mixing apparatus for mixing an emulsion of an amino resin precursor with an aqueous dispersion of an inorganic compound, its revolution velocity being set to 200 rpm, after the emulsion of the amino resin precursor was obtained by using the TK homomixer as the mixing device. As a result, obtained was an amino resin composite particle in a form of white powder. The quantity of the inorganic compound used was 7% by weight based on the weight of the amino resin precursor. Results of measurements of various properties of the amino resin composite particle are listed in Table 2.

EXAMPLE 8

The same reaction and procedure as Example 7 were carried out, apart from that 2900 g of an aqueous dispersion of alumina (supplied by Nippon Aerosil Co., Ltd.; Product Name: Aluminum oxide C, having a primary particle diameter of 0.01 µm) having a solid content concentration of 10% by weight was used as the aqueous dispersion of the inorganic compound, in replacement of aforementioned AEROSIL 200 having the solid content concentration of 10% by weight. As a result, obtained was an amino resin composite particle in a form of a white powder. Based on the weight of the amino resin precursor the quantity of the inorganic compound used was 7% by weight. Measurements were carried out as in Example 1, showing that the amino resin composite particle had an average particle diameter (d50) of 9.2 µm, where its mother particle had an average particle diameter of 9.1 µm, and a standard deviation of 5.0 µm. The heat treatment method showed that a firm-adhering ratio was 95%. Those results of the measurements are listed in Table 3. Note that the measurement also showed that the amino resin composite particle had an electrostatic charge of +2.6 µC/g.

Furthermore, the thus obtained amino resin composite particle was subjected to mapping of aluminum Kα (2000×) on an X-ray micro analyzer (mentioned above), in order to check how firmly alumina (child particle) was adhered in the amino resin composite particle. The mapping showed that aluminum was firmly adhered on the amino resin particle.

EXAMPLE 9

The same reaction and procedure as Example 1 were carried out, apart from that 3250 g of an aqueous dispersion titania (supplied by Ishihara Industry Co., Ltd.; Product Name: TTO-55 (N), having a primary particle diameter 0.04 µm) having a solid content concentration of 10% by weight was used as the aqueous dispersion of the inorganic compound, in replacement of the aforementioned super colloid #16 having the solid content concentration of 22% by weight. As a result, obtained was an amino resin composite particle in a form of white powder. Based on the weight of the amino resin precursor, the quantity of the inorganic compound used was 8% by weight. Measurements were carried out as in Example 1, showing that the amino resin composite particle had an average particle diameter (d50) of 8.9 µm, where its mother particle also had an average particle diameter of 8.9 µm, and a standard deviation of 4.7 µm. The heat treatment method showed that a firm-adhering ratio was 75%. Those results of the measurements are listed in Table 3. Note that the measurement also showed that the amino resin composite particle had an electrostatic charge of +2.0 µC/g.

Furthermore, the thus obtained amino resin composite particle was subjected to mapping of titan Kα (2000×) on an X-ray micro analyzer (mentioned above), in order to check how firmly titania (child particle) was adhered in the amino resin composite particle. The mapping showed that titanium was firmly adhered on the amino resin particle.

EXAMPLE 10

To begin with a resin was prepared as in Example 1, so as to obtain a reaction mixture containing an amino resin precursor. Then, the reaction mixture was mixed by using the TK homomixer as the mixing device for emulsifying the reaction mixture containing the amino resin precursor, at a temperature of 77° C. as in Example 1, thereby obtaining an emulsion of the amino resin precursor.

Next, the emulsion was cooled down to a temperature of 25° C., without adding an aqueous dispersion of the inorganic compound. After cooling, with a stir, added into the emulsion was an aqueous solution of dodecyl benzene sulfonic acid in which 80 g of dodecyl benzene sulfonic acid as the catalyst was dissolved in 1500 g of pure water. Then, with a stir, the emulsion was heated up to a temperature of 40° C., and then maintained at this temperature for one hour so as to precede condensation and hardening of the amino resin precursor. After that, into the reaction mixture in which the (hardening) reaction was being taking place but had not completed yet, an aqueous solution of dodecyl benzene sulfonic acid in which 160 g of dodecyl benzene sulfonic acid was dissolved in 3000 g of pure water was further added. Then the mixture was heated up to a temperature of 50° C. a rate of 10° C. per hour, with a stir.

After that, into the reaction mixture in which the (hardening) reaction was being taking place but had not completed yet, an aqueous solution of polyvinyl alcohol (same as that used in Example 1) as the emulsifier in which 100 g of polyvinyl alcohol was dissolved in 700 g of water was added. Then, while keeping the temperature of the reaction mixture at 50° C., the reaction mixture was mixed at a revolution velocity of 7000 rpm and for three minutes by using the TK homomixer as the mixing device for suspending the reaction mixture containing the amino resin precursor (amino resin precursor and/or an amino resin particle (amino resin bridged particle)), which is partially hardened. Then, 500 g of formalin (same as that used in Example 1) was added into the reaction mixture, and mixed for 3 minutes in the same manner. Then, into the reaction mixture, a dispersion of Ceria (supplied by C.I Kasei Co., Ltd.; Product Name: NanoTek $CeO_2$, having a primary particle diameter of 0.01µ), in which 450 g of Celia was dispersed in 4000 g of water was added gently as the aqueous dispersion of the inorganic compound. After that, the reaction mixture was mixed by using the TK homomixer as the mixing apparatus having a shear force for firmly adhering the child particle of the inorganic compound on the mother particle of the amino resin particle, at a revolution velocity of 5000 rpm for five minutes, while keeping the reaction mixture at 50° C.

After that, the reaction mixture was heated up to 90° C. at a rate of 10° C. per hour. Then, the reaction mixture was maintained at the temperature for one hour so that the amino resin precursor that had been partially hardened and the inorganic compound were condensed and hardened together. In other words, the amino resin precursor that had been partially hardened and the inorganic compound were attached together while they were still particles dispersed in the aqueous dispersion. In this manner, obtained was an amino resin composite particle in which the child particle of the inorganic compound covered the surface of the mother particle of the amino resin composite particle so that the child particle of the inorganic compound was firmly adhered on the surface of the amino resin particle.

After the hardening was completed, the same procedure, such as the heat treatment, as in Example 1, was carried out thereby obtaining an amino resin composite particle in a form of brown powder. Based on the weights of the amino resin precursor and the amino resin particle (amino resin bridged particle), the inorganic compound of a quantity of 10% by weight was used. Moreover, measurements were carried out as in Example 1, showing that the amino resin composite particle had an average particle diameter (d50) of 8.6 µm, where its mother particle had an average particle diameter of 8.5 µm, and a standard deviation of 4.8 µm. The heat treatment method showed that a firm-adhering ratio was 93%. Those results of the measurements are listed in Table 3.

Furthermore, the thus obtained amino resin composite particle was subjected to mapping of cerium Lα (2000×) on an X-ray micro analyzer (mentioned above), in order to check how firmly Ceria (child particle) was adhered in the amino resin composite particle. The mapping showed that cerium was firmly adhered on the amino resin particle.

EXAMPLE 11

To begin with a resin was prepared as in Example 1, so as to obtain a reaction mixture containing an amino resin precursor. Then, the reaction mixture was mixed by using the TK homomixer as the mixing device for emulsifying the reaction mixture containing the amino resin precursor, at a temperature of 77° C. as in Example 1, thereby obtaining an emulsion of the amino resin precursor.

Next, the emulsion was cooled down to a temperature of 25° C., without adding an aqueous dispersion of the inorganic compound. After cooling, with a stir, added into the emulsion was an aqueous solution of dodecyl benzene sulfonic acid in which 80 g of dodecyl benzene sulfonic acid as the catalyst was dissolved in 1500 g of pure water. Then, with a stir, the emulsion was heated up to a temperature of 40° C., and then maintained at this temperature for one hour so as to precede condensation and hardening of the amino resin precursor. After that, into the reaction mixture in which the (hardening) reaction was being taking place but had not completed yet, an aqueous solution of dodecyl benzene sulfonic acid in which 160 g of dodecyl benzene sulfonic acid was dissolved in 3000 g of pure water was further added. Then the mixture was heated up to a temperature of 90° C. a rate of 10° C. per hour, with a stir. When reached at 90° C., the reaction mixture was maintained at the temperature for another one hour, so as to condensate and harden the amino resin precursor, thereby obtaining an amino resin particle (amino resin bridged particle).

After the hardening was completed, an aqueous solution of polyvinyl alcohol (same as that used in Example 1) as the emulsifier in which 100 g of polyvinyl alcohol was dissolved in 700 g of water was added, the aqueous solution being adjusted to a temperature of 90° C. Then, while keeping the temperature of the reaction mixture at 90° C., the reaction mixture was mixed at a revolution velocity of 5000 rpm and for three minutes by using the TK homomixer as the mixing device for suspending the reaction mixture containing the amino resin precursor (amino resin precursor and/or an amino resin particle (amino resin bridged particle)). Then, 500 g of formalin (same as that used in Example 1) was added into the reaction mixture, and mixed for 3 minutes in the same manner. Then, into the reaction mixture, a dispersion of NanoTek $CeO_2$ in which 450 g of NanoTek $CeO_2$ was dispersed in 4000 g of water was added gently as the aqueous dispersion of the inorganic compound. After that, the reaction mixture was mixed by using the TK homomixer as the mixing apparatus having a shear force for firmly adhering the child particle of the inorganic compound on the mother particle of the amino resin particle, at a revolution velocity of 5000 rpm for five minutes, while keeping the reaction mixture at 90° C. Then, the reaction mixture was mixed for one hour at 90° C. by using a general mixer, replacing the TK homomixer.

After that, the reaction mixture was cooled down to a temperature of 30° C. Then, the reaction mixture was filtered to separate the amino resin composite particle out, in the same manner as in Example 1. The thus separated amino resin composite particle was subjected to a heat treatment or the like, thereby obtaining an amino resin composite particle in a form of brown powder. Based on the weight of the amino resin particle (amino resin bridged particle) after hardened, the inorganic compound used had a quantity 10% by weight. Moreover, measurements were carried out as in Example 1, showing that the amino resin composite particle had an average particle diameter (d50) of 8.8 µm, where its mother particle also had an average particle diameter of 8.8 µm, and a standard deviation of 4.5 µm. The heat treatment method showed that a firm-adhering ratio was 91%. Those results of the measurements are listed in Table 3.

Furthermore, the thus obtained amino resin composite particle was subjected to mapping of cerium Lα (2000×) on an X-ray micro analyzer (mentioned above), in order to check how firmly Ceria (child particle) was adhered in the amino resin composite particle. The mapping showed that cerium was firmly adhered on the amino resin particle.

COMPARATIVE EXAMPLE 3

The same reaction and procedure as in Example 11 was carried out, apart from that the aqueous solution of the polyvinyl alcohol as the emulsifier was not added into the reaction mixture after the hardening was completed. Thereby, an amino resin composite particle in a form of white particle was obtained.

Furthermore, the thus obtained amino resin composite particle was subjected to mapping of cerium Lα (2000×) on an X-ray micro analyzer (mentioned above), in order to check how firmly Ceria (child particle) was adhered in the amino resin composite particle. The mapping showed that most of cerium was not firmly adhered on the amino resin particle. Results of measurements performed as in Example 1 are listed in Table 3.

EXAMPLE 12

3000 g (16.0 mole) of benzoguanamine as an amino compound, 2600.0 g (equivalent to 32.0 mole of formaldehyde) of formalin having a concentration of 37% by weight, 10 g (equivalent to 0.01 of sodium carbonate) of an aqueous solution of sodium carbonate of 10% by weight, were added into a 10 L-volumed reaction vessel provided with a reflux condenser, a mixer, a thermometer, an oscillating viscometer (same as that used in Example 1) and the like, so as to obtain a reaction mixture. Then, the reaction mixture thus prepared was heated with a stir so as to be reacted at a temperature of 95° C.

The reaction was continued until the reaction mixture attained a viscosity of $4.5 \times 10^{-2}$ Pa·s (45 cP), and then cooled down, thus terminating the reaction (resin forming reaction). Thereby, obtained was the reaction mixture containing the amino resin precursor, which was an initial condensate of benzoguanamine and formaldehyde.

Then, an aqueous solution of polyvinyl alcohol, prepared by dissolving 150 g of polyvinyl alcohol (supplied by Kuraray Co., Ltd; Product Name PVA205) as the emulsifier in 2200 g of water, was added into a 25 L-volumed reaction vessel provided with a reflux condenser, a thermometer and the TK homomixer (same as that used in Example 1), and the like. The TK homomixer worked as the mixing device for use in emulsifying the reaction mixture containing the amino resin precursor, and the mixing apparatus having a high shear force for use in firmly adhering child particle composed of the inorganic compound onto the amino resin particulates as mother particle. Then, the aqueous solution was heated up to 75° C. with a stir. Then, the reaction mixture was added into the reaction vessel. After the addition, emulsification of the amino resin precursor was carried out while severely stirring the content at a revolution velocity of 7000 rpm by using the mixing apparatus having a high shear force, while the temperature was heated to 77° C. and maintained while keeping the temperature at 77° C. In this way, obtained was the emulsion containing the amino resin precursor having a concentration of 56.6% by weight, terminating the emulsification step.

The emulsion was measured by using a multi-sizer (made by Coulter Co., Ltd; Coulter multisizer type II). The measurement showed that the amino resin precursor in the emulsion had an average particle diameter (d50) of 2.0 µm. Furthermore, into the thus obtained emulsion, 10000 g of water having a normal temperature (25° C.) was added at once. Then, the emulsion was cooled down to 30° C. with a stir.

Next, 3256 g of an aqueous dispersion of AEROSIL 200 (mentioned above) having a solid content concentration of 10% by weight was added as an aqueous dispersion of silica as the inorganic compound into the reaction vessel. Then, the content of the reaction vessel was mixed for five minutes by using the TK homomixer as the mixing apparatus having the same shearing force, at a revolution velocity of 4000 rpm.

Next, added into the emulsion was an aqueous solution of sulfuric acid in which 40 g (0.6 mol) of sulfuric acid was dissolved in 1200 g of pure water (where the content had a temperature of 30° C.). The content was, with a stir, heated up to 90° C. at a rate of 10° C. per hour. When reached 90° C., the temperature was maintained for one hour so as to condensate and harden the amino resin precursor with the inorganic compound. Thus, reaction (hardening) time was 7 hours in total.

After the hardening (hardening step) was completed, the obtained dispersion of the amino resin composite particle (amino resin bridged composite coated particle) was cooled down to 30° C. Then, the dispersion was neutralized by using an aqueous solution of sodium hydroxide of 5% by weight, so as to adjust pH of the dispersion to 7.5. Then, the dispersion containing the amino resin composite particle was separated from the reaction mixture (reaction system). It was confirmed that the dispersion was usable as the emulsion containing the amino resin composite particle. After that, the amino resin composite particle of the present invention was filtered so as to be separated from the dispersion. The thus separated amino resin composite particle was heated at 150° C. for three hours, and then was ground in a mortar by gently pestling with a pestle, thereby obtaining the amino resin composite particle in a form of white powder. The amino resin composite particle was measured by using Coulter multisizer type II (mentioned above). The measurement showed that the amino resin composite particle had an average particle diameter (d50) of 2.2 µm. Listed in Table 4 are the average particle diameter (d50), an average particle diameter of the mother particle thereof, a standard deviation, a firm-adhering ratio, and the like, which were measured as in Example 1.

EXAMPLE 13

3200 g (17.1 mole) of benzoguanamine as an amino compound, 2810.0 g (equivalent to 34.7 mole of formaldehyde) of formalin having a concentration of 37% by weight, 10 g (equivalent to 0.01 of sodium carbonate) of an aqueous solution of sodium carbonate of 10% by weight, were added into a 10 L-volumed reaction vessel provided with a reflux condenser, a mixer, a thermometer, an oscillating viscometer (same as that used in Example 1) and the like, so as to obtain a reaction mixture. Then, the reaction mixture thus prepared was heated with a stir so as to be reacted at a temperature of 95° C.

The reaction was continued until the reaction mixture attained a viscosity of $4.0 \times 10^{-2}$ Pa·s (40 cP), and then cooled down, thus terminating the reaction (resin forming reaction). Meanwhile, a dispersion was prepared by adding 50 g of oil-soluble dye (supplied by Arimoto Chemical Co., Ltd.; Product Name: Fluorescent Red 632) into an aqueous solution of a dispersion auxiliary agent (supplied by KAO Corp.; Product Name: Emulgen 920), in which 0.5 g of the dispersion auxiliary agent was dissolved in 70 g of pure water. Then, the thus prepared dispersion was added into the reaction mixture, and then mixed. Thereby, obtained was a colored reaction mixture (an aqueous dispersion of the amino resin precursor) containing the amino resin precursor, which was an initial condensate of benzoguanamine and formaldehyde.

Then, an aqueous solution of polyvinyl alcohol, prepared by dissolving 120 g of polyvinyl alcohol (supplied by Kuraray Co., Ltd; Product Name PVA205) as the emulsifier in 300 g of water, was added into a 10 L-volumed reaction vessel provided with a reflux condenser, a thermometer, and the TK homomixer (same as that used in Example 1), and the like. The TK homomixer worked as the mixing device for use in emulsifying the reaction mixture containing the amino resin precursor, and the mixing apparatus having a high shear force for use in firmly adhering child particle composed of the inorganic compound onto the amino resin particulates as mother particle. Then, the aqueous solution was heated up to 75° C. with a stir. Then, the reaction mixture was added into the reaction vessel. After the addition, emulsification of the amino resin precursor was carried out while severely stirring the content at a revolution velocity of 7000 rpm by using the mixing apparatus having a high shear force, while the temperature was heated to 77° C. and maintained. In this way, obtained was a pink-colored emulsion containing the amino resin precursor having a concentration of 47.6% by weight, terminating the emulsification step.

The emulsion was measured by using the Coulter Co., Ltd; Coulter multisizer type II (describe above). The measurement showed that the amino resin precursor in the emulsion had an average particle diameter (d50) of 2.9 µm. Furthermore, into the thus obtained emulsion, 5000 g of water having a normal temperature (25° C.) was added at once. Then, the emulsion was cooled down to 30° C. with a stir.

Next, 3256 g of an aqueous dispersion of Aluminum oxide C (described above) having a solid content concentration of 10% by weight was added as an aqueous dispersion of aluminum as the inorganic compound into the reaction vessel. Then, the content of the reaction vessel was mixed for five minutes by using the TK homomixer as the mixing apparatus having the same shearing force, at a revolution velocity of 4000 rpm.

Next, added into the emulsion was an aqueous solution of "acid Red 52" in which 7 g of acid Red 52 was dissolved in 650 g of pure water. After the addition, the emulsion was mixed for 5 minutes. Then, an aqueous solution of dodecyl benzene sulfonic acid, in which 40 g of docecyl benzene sulfonic acid as the catalyst was dissolved in 1200 g of pure water was added to the emulsion (the content had a temperature of 30° C.). Then, the emulsion was heated up to 90° C. at a rate of 10° C. per hour, with a stir. When reached 90° C., the temperature was maintained for one hour so as to condensate and harden the amino resin precursor with the inorganic compound. Thus, reaction (hardening) time was seven hours in total.

After the hardening (hardening step) was completed, the obtained dispersion of the amino resin composite particle (amino resin bridged composite coated particle) was cooled down to 30° C. Then, the dispersion was neutralized by using an aqueous solution of sodium hydroxide of 5% by weight, so as to adjust pH of the dispersion to 7.5. After the neutralization, the dispersion containing the amino resin composite particle was separated from the reaction mixture in the same manner as in Example 12 (whereas the dispersion in the present Example was colored). It was confirmed that the dispersion was usable as the emulsion containing the amino resin composite particle. After that, the amino resin composite particle of the present invention was filtered so as to be separated from the dispersion. The thus separated amino resin composite particle was heated at 150° C. for three hours, and then was ground in a mortar by gently pestling with a pestle, thereby obtaining the amino resin composite particle in a form of red powder. The amino resin composite particle was measured by using Coulter multisizer type II (mentioned above). The measurement showed that the amino resin composite particle had an average particle diameter (d50) of 3.1 μm. Listed in Table 4 are the average particle diameter (d50), an average particle diameter of the mother particle thereof, a standard deviation, a firm-adhering ratio, and the like, which were measured as in Example 1.

TABLE 1

|  | EX. 1 | EX. 2 | EX. 3 | EX. 4 | EX. 5 |
| --- | --- | --- | --- | --- | --- |
| Mixing Device | TK. | TK. | TK. | TK. | TK. |
| Rev. Vel. (rpm) | 7000 | 7000 | 7000 | 7000 | 7000 |
| Mixing App. | TK. | Tkdm. | EBA. | HP. H. | Stick |
| Rev. Vel (rpm) | 7000 | 7000 | 4000 | — | — |
| Dis. Pre. (MPa) | — | — | — | 70 | 10 |
| I.T.S. (M/s) | 12 | 12 | 6 | — | — |
| Inorganic | SC.#16 | SC.#16 | SC.#16 | SC.#16 | SC.#16 |
| Quantity (wt %) | 8 | 8 | 8 | 8 | 8 |
| Ave. P.D. of MP. | 6.5 | 7.0 | 6.2 | 3.8 | 5.2 |
| Ave. P.D. of CP. | 0.3 | 0.3 | 0.3 | 0.3 | 0.3 |
| Ave. P.D. of ARCP. | 9.1 | 9.3 | 8.6 | 6.1 | 7.5 |
| Stand. Dev. (μm) | 4.8 | 4.9 | 4.8 | 2.8 | 3.1 |
| Cont. % of ARCP. | 7 | 7 | 7 | 7 | 7 |
| F. Ratio (CF) (%) | 96 | 92 | 95 | 97 | 93 |
| F. Ratio (HT) (%) | 94 | 91 | 93 | 96 | 91 |
| Oil Ab. (ml/100 g) | 150 | 140 | 150 | 145 | 140 |
| P. Res. (Ω · cm) | $7.5 \times 10^5$ | $5.0 \times 10^6$ | $7.0 \times 10^5$ | $5.0 \times 10^5$ | $5.0 \times 10^6$ |
| E.A. (μC/g) | −8.0 | −6.5 | −8.1 | −8.5 | −7.5 |

TABLE 2

|  | EX. 6 | EX. 7 | C. EX. 1 | C. EX. 2 |
| --- | --- | --- | --- | --- |
| Mixing Device | TK. | EBA. | TK. | TK. |
| Rev. Vel. (rpm) | 7000 | 5000 | 7000 | 7000 |
| Mixing App. | TK. | EBA. | Four P. | Four P. |
| Rev. Vel (rpm) | 7000 | 5000 | 200 | 200 |
| Dis. Pre. (MPa) | — | — | — | — |
| I.T.S. (M/s) | 12 | 8 | 0.5 | 0.5 |
| Inorganic | A. 200 | A. 200 | SC. #16 | A. 200 |
| Quantity (wt %) | 8 | 7 | 8 | 7 |
| Ave. P.D. of MP. | 9.1 | 8.9 | 6.5 | 9.3 |
| Ave. P.D. of CP. | 0.01 | 0.01 | 0.3 | 0.01 |
| Ave. P.D. of ARCP. | 9.1 | 9.0 | 9.5 | 9.3 |
| Stand. Dev. (μm) | 5.0 | 4.8 | 5.3 | 5.1 |
| Cont. % of ARCP. | 7 | 6 | 7 | 7 |
| F. Ratio (CF) (%) | 80 | 100 | 5 | 3 |
| F. Ratio (HT) (%) | 74 | 93 | 3 | 2 |
| Oil Ab. (ml/100 g) | 145 | 90 | 160 | 110 |
| P. Res. (Ω · cm) | $5.0 \times 10^6$ | $7.0 \times 10^5$ | $1.6 \times 10^{10}$ | $1.0 \times 10^{11}$ |
| E.A. (μC/g) | −6.0 | −8.5 | −5.0 | +0.9 |

TABLE 3

|  | EX. 8 | EX. 9 | EX. 10 | EX. 11 | C. EX. 3 |
| --- | --- | --- | --- | --- | --- |
| Mixing Device | EBA. | TK. | TK. | TK. | TK. |
| Rev. Vel. (rpm) | 5000 | 7000 | 7000 | 7000 | 7000 |
| Mixing App. | EBA. | TK. | TK. | TK. | TK. |
| Rev. Vel (rpm) | 5000 | 7000 | 5000 | 5000 | 5000 |
| Dis. Pre. (MPa) | — | — | — | — | — |
| I.T.S. (M/s) | 8 | 12 | 8 | 8 | 8 |
| Inorganic | Al.-C | TT0-55 (N) | Nano. | Nano. | Nano. |
| Quantity (wt %) | 7 | 8 | 10 | 10 | 10 |
| Ave. P.D. of MP. | 9.1 | 8.9 | 8.5 | 8.8 | 8.8 |
| Ave. P.D. of CP. | 0.01 | 0.04 | 0.01 | 0.01 | 0.01 |
| Ave. P.D. of ARCP. | 9.2 | 8.9 | 8.6 | 8.8 | 8.8 |
| Stand. Dev. (μm) | 5.0 | 4.7 | 4.8 | 4.5 | 4.5 |
| Cont. % of ARCP | 6 | 7 | 9 | 9 | 3 |
| F. Ratio (HT) (%) | 95 | 75 | 93 | 91 | 1 |

TABLE 4

|  | EX. 12 | EX. 13 |
| --- | --- | --- |
| Mixing Device | TK. | TK. |
| Rev. Vel. (rpm) | 7000 | 7000 |
| Mixing App. | TK. | TK. |
| Rev. Vel (rpm) | 4000 | 4000 |
| Dis. Pre. (MPa) | — | — |
| I.T.S. (M/s) | 6 | 6 |
| Inorganic | A. 200 | Al.-C |
| Quantity (wt %) | 8 | 7 |
| Ave. P.D. of MP. | 2.0 | 2.9 |
| Ave. P.D. of CP. | 0.01 | 0.01 |
| Ave. P.D. of ARCP. | 2.2 | 3.1 |
| Stand. Dev. (μm) | 0.9 | 1.2 |
| Cont. % of ARCP | 7 | 7 |
| F. Ratio (HT) (%) | 83 | 85 |

ABBREVIATION IN TABLES:
EX.: Example
Rev. Vel.: Revolution Velocity
Dis. Pre.: Discharge Pressure
I.T.S.: Impeller Tip Speed
Ave. P.D.: Average Particle Diameter
MP.: Mother Particle
CP.: Child Particle
ARCP: Amino Resin Composite Particle
Stand. Dev.: Standard Deviation
Cont. %: Content by Percentage
F. Ratio: Firm-Adhering Ratio
CF: Centrifugal Separation Method
HT: Heat Treatment Method
Oil Ab.: Oil Absorption
P. Res.: Particle Resistivity
E.A.: Electrostatic Charge Amount
TK.: TK Homomixer
EBA.: EBARA Milder
HP. H.: High Pressure Homogenizer
Stick: Stick Mixer
SC.#16: Super Colloid #16
Four P.: Four-Paddle Mixer
A. 200: AEROSIL 200
Al.-C: Aluminum Oxide C
Nano.: NanoTek $CeO_2$
Tkdm: TK Lab Dispersion Mill The invention shall not be limited by those embodiments and the examples, and may be varied within the scope of the following claims. Thus, any combinations of those embodiments and the examples are included within the scope of the technical concept of the invention.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An amino resin composite particle, in which an inorganic compound is fixed as a child particle on a surface of an amino resin particle serving as a mother particle, and in which at least part of the child particle composed of the inorganic compound is substantially embedded in the surface of the amino resin particle with high shear force, the amino resin composite particle having a firm-adhering ratio of the inorganic compound of 10% or more, which is calculated out by the following equation:

the firm-adhering ratio (%)=(1A/B)×100, where A is the weight of the inorganic compound fallen off from the surface of the amino resin composite particle by mixing a suspension containing as a solid content 10% the amino resin composite particle by weight at an impeller tip speed of 5.2 m/s, and B is a weight of the inorganic compound in the amino resin composite particle before the mixing, the weight B being determined by a content by percentage of the inorganic compound in the amino resin composite particle, the content by percentage of the inorganic compound in the amino resin composite particle ranging from 1% to 30% by weight, by mixing an aqueous dispersion, in the presence of an emulsifier, with the high shear force application, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be fixed, and (II) an inorganic compound to adhere thereon, in such a manner that (I) the at least one of (XX) the amino resin precursor, (YY) the partially-hardened amino resin precursor, and (ZZ) the amino resin particle, and (II) the inorganic compound are dispersed in water;

wherein: (i) the shear force is applied to mix the aqueous dispersion, by using a blade revolving at an impeller tip speed in a range between 2 m/s and 30 m/s, so as to shear, in the presence of an emulsifier, (I) the at least one of (XX) the amino resin precursor, (YY) the partially-hardened amino resin precursor, and (ZZ) the amino resin particle, and (II) the inorganic compound, while (I) the at least one of (XX) the amino resin precursor, (YY) the partially-hardened amino resin precursor, and (ZZ) the amino resin particle, and (II) the inorganic compound are dispersed in water; (ii) the shear force is applied to mix the aqueous dispersion, by colliding against each other at a discharging pressure between 3 MPa and 49 MPa, in the presence of an emulsifier, (I) the at least one of (XX) the amino resin precursor, (YY) the partially-hardened amino resin precursor, and (ZZ) the amino resin particle, and (II) the inorganic compound, while (I) the at least one of (XX) the amino resin precursor, (YY) the partially-hardened amino resin precursor, and (ZZ) the amino resin particle, and (II) the inorganic compound are dispersed in water; or (iii) the shear force is applied to mix the aqueous dispersion, by introducing or forcibly circulating, at a discharging pressure of 0.1 MPa to 1.47 MPa, in the presence of an emulsifier, (I) the at least one of (XX) the amino resin precursor, (YY) the partially-hardened amino resin precursor, and (ZZ) the amino resin particle, and (II) the inorganic compound, in a bath tank of a mixing apparatus, the bath tank being provided with a baffle plate for turning a flow direction by 90 degrees, while (I) the at least one of (XX) the amino resin precursor, (YY) the partially-hardened amino resin precursor, and (ZZ) the amino resin particle, and (II) the inorganic compound are dispersed in water;

the inorganic compound has an average particle diameter 0.05 to 0.001 times that of the amino resin particle as the mother particle;

the amino resin particle has an average particle diameter within a range of 1 μm to 30 μm, the inorganic compound has an average particle diameter within a range of 0.001 μm to 1.5 μm, and the average particle diameter of the mother particle is greater than that of the child particle.

2. The amino resin composite particle as set forth in claim 1, wherein:
the quantity of the inorganic compound thus fallen off from the surface of the amino resin composite particle is measured by a centrifugal separation method or a heat treatment method.

3. The amino resin composite particle as set forth in claim 1, wherein:
the amino resin precursor is prepared by reacting an amino compound with formaldehyde so that the amino resin precursor obtains a viscosity within a range of $2 \times 10^{-2}$ Pa·s to $5.5 \times 10^{-2}$ Pa·s at a temperature within a range of 95° C. to 98° C.

4. The amino resin composite particle as set forth in claim 1 wherein the amino resin particle, on which the inorganic compound is to be fixed, is a hardened amino resin particle.

5. The amino resin composite particle as set forth in claim 1 wherein, the amino resin precursor is completely hardened by adding a catalyst into the emulsion.

6. An amino resin composite particle, in which an inorganic compound is fixed as a child particle on a surface of an amino resin particle serving as a mother particle, and in which at least part of the child particle composed of the inorganic compound is substantially embedded in the surface of the amino resin particle with high shear force,
the amino resin composite particle having a firm-adhering ratio of the inorganic compound of 10% or more, which is calculated out by the following equation:

the firm-adhering ratio (%)=(1$A/B$)×100, where A is the weight of the inorganic compound fallen off from the surface of the amino resin composite particle by mixing a suspension containing as a solid content 10% the amino resin composite particle by weight at an impeller tip speed of 5.2 m/s, and B is a weight of the inorganic compound in the amino resin composite particle before the mixing, the weight B being determined by a content by percentage of the inorganic compound in the amino resin composite particle,
the content by percentage of the inorganic compound in the amino resin composite particle ranging from 1% to 30% by weight,
by mixing an aqueous dispersion, in the presence of an emulsifier, with the high shear force application, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be fixed, and (II) an inorganic compound to adhere thereon, in such a manner that (I) the at least one of (XX) the amino resin precursor, (YY) the partially-hardened amino resin precursor, and (ZZ) the amino resin particle, and (II) the inorganic compound are dispersed in water;
wherein the high shearing force is applied to mix the aqueous dispersion, by using a blade revolving at an impeller tip speed in a range between 2 m/s and 30 μm/s, so as to shear, in the presence of an emulsifier, (I) the at least one of (XX) the amino resin precursor, (YY) the partially-hardened amino resin precursor, and (ZZ) the amino resin particle, and (II) the inorganic compound, while (I) the at least one of (XX) the amino resin precursor, (YY) the partially-hardened amino resin precursor, and (ZZ) the amino resin particle, and (II) the inorganic compound are dispersed in water.

7. An amino resin composite particle, in which an inorganic compound is fixed as a child particle on a surface of an amino resin particle serving as a mother particle, and in which at least part of the child particle composed of the inorganic compound is substantially embedded in the surface of the amino resin particle with high shear force,
the amino resin composite particle having a firm-adhering ratio of the inorganic compound of 10% or more, which is calculated out by the following equation:

the firm-adhering ratio (%)=(1$A/B$)×100, where A is the weight of the inorganic compound fallen off from the surface of the amino resin composite particle by mixing a suspension containing as a solid content 10% the amino resin composite particle by weight at an impeller tip speed of 5.2 m/s, and B is a weight of the inorganic compound in the amino resin composite particle before the mixing, the weight B being determined by a content by percentage of the inorganic compound in the amino resin composite particle,
the content by percentage of the inorganic compound in the amino resin composite particle ranging from 1% to 30% by weight,
by mixing an aqueous dispersion, in the presence of an emulsifier, with the high shear force application, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be fixed, and (II) an inorganic compound to adhere thereon, in such a manner that (I) the at least one of (XX) the amino resin precursor, (YY) the partially-hardened amino resin precursor, and (ZZ) the amino resin particle, and (II) the inorganic compound are dispersed in water;
wherein the high shearing force is applied to mix the aqueous dispersion, by colliding against each other at a discharging pressure between 3 MPa and 49 MPa, in the presence of an emulsifier, (I) the at least one of (XX) the amino resin precursor, (YY) the partially-hardened amino resin precursor, and (ZZ) the amino resin particle, and the inorganic compound, while (I) the at least one of (XX) the amino resin precursor, (YY) the partially-hardened amino resin precursor, and (ZZ) the amino resin particle, and (II) the inorganic compound are dispersed in water.

8. An amino resin composite particle, in which an inorganic compound is fixed as a child particle on a surface of an amino resin particle serving as a mother particle, and in which at least part of the child particle composed of the inorganic compound is substantially embedded in the surface of the amino resin particle with high shear force,
the amino resin composite particle having a firm-adhering ratio of the inorganic compound of 10% or more, which is calculated out by the following equation:

the firm-adhering ratio (%)=(1$A/B$)×100, where A is the weight of the inorganic compound fallen off from the surface of the amino resin composite particle by mixing a suspension containing as a solid content 10% the amino resin composite particle by weight at an impeller tip speed of 5.2 m/s, and B is a weight of the inorganic compound in the amino resin composite particle before the mixing, the weight B being determined by a content by percentage of the inorganic compound in the amino resin composite particle, the content by percentage of the inorganic compound in the amino resin composite particle ranging from 1% to 30% by weight, by mixing an aqueous dispersion, in the presence of an emulsifier, with the high shear force application, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be fixed, and (II) an inorganic compound to adhere thereon, in such a manner that (I) the at least one of (XX) the amino resin precursor, (YY) the partially-hardened amino resin precursor, and (ZZ) the amino resin particle, and (II) the inorganic compound are dispersed in water;

wherein the high shearing force is applied to mix the aqueous dispersion, by introducing or forcibly circulating, at a discharging pressure of 0.1 MPa to 1.47 MPa, in the presence of an emulsifier, (I) the at least one of (XX) the amino resin precursor, (YY) the partially-hardened amino resin precursor, and (ZZ) the amino resin particle, and the inorganic compound, in a bath tank of a mixing apparatus, the bath tank being provided with a baffle plate for turning a flow direction by 90 degrees, while (I) the at least one of (XX) the amino resin precursor, (YY) the partially-hardened amino resin precursor, and (ZZ) the amino resin particle, and (II) the inorganic compound are dispersed in water.

9. A method of producing an amino resin composite particle, in which an inorganic compound is fixed as a child particle on a surface of an amino resin particle serving as a mother particle, and in which at least part of the child particle composed of the inorganic compound is substantially embedded in the surface of the amino resin particle with high shear force, comprising the step of:

(a) (a-1) preparing a suspension or an emulsion from an aqueous dispersion with a shear force application, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be fixed, (a-2) adding (II) an inorganic compound to the suspension or emulsion thus prepared, (II) the inorganic compound to adhere on the at least one of (XX) the amino resin precursor, (YY) the partially hardened amino resin precursor, and (ZZ) the amino resin particle, and (a-3) mixing, in the presence of an emulsifier, with the high shear force application, the suspension or emulsion thus prepared to contain (II) the inorganic compound, so as to fix (II) the inorganic compound thereon;

prior to the step (a):

(c) preparing an emulsion of (XX) the amino resin precursor to be the amino resin particle, by mixing an aqueous dispersion of (XX) the amino resin precursor, and an aqueous solution of the emulsifier; and (d) hardening (XX) the amino resin precursor by adding a catalyst into the emulsion thus prepared in the step (c), so as to prepare a suspension of (ZZ) the amino resin particle, in the step (a) the step (a-3) being a step of (f) adding, in addition to (II) the inorganic compound, an aqueous solution of the emulsifier into the suspension of (ZZ) the thus prepared amino resin particle; and the step (a-3) being a step of (e') mixing, with the high shear force application, the suspension and (II) the inorganic compound to adhere thereon, where the step (a) mixes the aqueous dispersion, in the presence of the emulsifier, with the high shear force application, the aqueous dispersion containing (I) (ZZ) the amino resin particle, and (II) the inorganic compound to adhere thereon, in such a manner that (I) (ZZ) the amino resin particle, and (II) the inorganic compound are dispersed in water;

wherein, in step (d), the amino resin precursor is completely hardened by adding a catalyst into the emulsion thus prepared in step (c); and wherein: (i) the shear force is applied to mix the aqueous dispersion, by using a blade revolving at an impeller tip speed in a range between 2 m/s and 30 m/s, so as to shear, in the presence of an emulsifier, (I) the at least one of (XX) the amino resin precursor, (YY) the partially-hardened amino resin precursor, and (ZZ) the amino resin particle, and (II) the inorganic compound, while (I) the at least one of (XX) the amino resin precursor, (YY) the partially-hardened amino resin precursor, and (ZZ) the amino resin particle, and (II) the inorganic compound are dispersed in water; (ii) the shear force is applied to mix the aqueous dispersion, by colliding against each other at a discharging pressure between 3 MPa and 49 MPa, in the presence of an emulsifier, (I) the at least one of (XX) the amino resin precursor, (YY) the partially-hardened amino resin precursor, and (ZZ) the amino resin particle, and (II) the inorganic compound, while (I) the at least one of (XX) the amino resin precursor, (YY) the partially-hardened amino resin precursor, and (ZZ) the amino resin particle, and (II) the inorganic compound are dispersed in water; or (iii) the shear force is applied to mix the aqueous dispersion, by introducing or forcibly circulating, at a discharging pressure of 0.1 MPa to 1.47 MPa, in the presence of an emulsifier, (I) the at least one of (XX) the amino resin precursor, (YY) the partially-hardened amino resin precursor, and (ZZ) the amino resin particle, and (II) the inorganic compound, in a bath tank of a mixing apparatus, the bath tank being provided with a baffle plate for turning a flow direction by 90 degrees, while (I) the at least one of (XX) the amino resin precursor, (YY) the partially-hardened amino resin precursor, and (ZZ) the amino resin particle, and (II) the inorganic compound are dispersed in water.

10. The method of producing an amino resin composite particle as set forth in claim 9, wherein the step (a) further includes the step of, prior to the step (e'):

(g) adding into the suspension of (ZZ) the thus prepared amino resin particle an aqueous solution of formaldehyde.

11. A method of producing an amino resin composite particle, in which an inorganic compound is fixed as a child particle on a surface of an amino resin particle serving as a mother particle, and in which at least part of the child particle composed of the inorganic compound is substantially embedded in the surface of the amino resin particle with high shear force, comprising the step of:

(a) (a-1) preparing a suspension or an emulsion from an aqueous dispersion with a shear force application, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be fixed, (a-2) adding (II) an inorganic compound to the suspension or emulsion thus prepared, (II) the inorganic compound to adhere on the at least one of (XX) the amino resin precursor, (YY) the partially hardened amino resin precursor, and (ZZ) the amino resin particle, and (a-3) mixing, in the presence of an emulsifier, with the high shear force application, the suspension or emulsion thus prepared to contain (II) the inorganic compound, so as to fix (II) the inorganic compound thereon;

wherein the high shearing force is applied to mix the emulsified aqueous dispersion, by colliding against each other at a discharging pressure between 3 MPa and 49 MPa, in the presence of an emulsifier, (I) the at least one of(XX) the amino resin precursor, (YY) the partially-hardened amino resin precursor, and (ZZ) the amino resin particle, and the inorganic compound, while (I) the at least one of (XX) the amino resin precursor, (YY) the partially-hardened amino resin precursor, and (ZZ) the amino resin particle, and (II) the inorganic compound are dispersed in water.

12. A method of producing an amino resin composite particle, in which an inorganic compound is fixed as a child particle on a surface of an amino resin particle serving as a mother particle, and in which at least part of the child particle composed of the inorganic compound is substantially embedded in the surface of the amino resin particle with high shear force, comprising the step of:

(a) (a-1) preparing a suspension or an emulsion from an aqueous dispersion with a shear force application, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be fixed, (a-2) adding (II) an inorganic compound to the suspension or emulsion thus prepared, (II) the inorganic compound to adhere on the at least one of (XX) the amino resin precursor, (YY) the partially hardened amino resin precursor, and (ZZ) the amino resin particle, and (a-3) mixing, in the presence of an emulsifier, with the high shear force application, the suspension or emulsion thus prepared to contain (II) the inorganic compound, so as to fix (II) the inorganic compound thereon;

wherein the high shearing force is applied to mix the emulsified aqueous dispersion, by introducing or forcibly circulating, at a discharging pressure of 0.1 MPa to 1.47 MPa , in the presence of an emulsifier, (I) the at least one of (XX) the amino resin precursor, (YY) the partially-hardened amino resin precursor, and (ZZ) the amino resin particle, and the inorganic compound, in a bath tank of a mixing apparatus, the bath tank being provided with a baffle plate for turning a flow direction by 90 degrees, while (I) the at least one of (XX) the amino resin precursor, (YY) the partially-hardened amino resin precursor, and (ZZ) the amino resin particle, and (II) the inorganic compound are dispersed in water.

13. A method of producing an amino resin composite particle, in which an inorganic compound is fixed as a child particle on a surface of an amino resin particle serving as a mother particle, and in which at least part of the child particle composed of the inorganic compound is substantially embedded in the surface of the amino resin particle with high shear force, comprising the step of:

(a) (a-1) preparing a suspension or an emulsion from an aqueous dispersion with a shear force application, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be fixed, (a-2) adding (II) an inorganic compound to the suspension or emulsion thus prepared, (II) the inorganic compound to adhere on the at least one of (XX) the amino resin precursor, (YY) the partially hardened amino resin precursor, and (ZZ) the amino resin particle, and (a-3) mixing, in the presence of an emulsifier, with the high shear force application, the suspension or emulsion thus prepared to contain (II) the inorganic compound, so as to fix (II) the inorganic compound thereon;

wherein the high shearing force is applied to mix the emulsified aqueous dispersion, by using a blade revolving at an impeller tip speed in a range between 2 m/s and 30 m/s, so as to shear, in the presence of an emulsifier, (I) the at least one of (XX) the amino resin precursor, (YY) the partially-hardened amino resin precursor, and (ZZ) the amino resin particle, and (II) the inorganic compound, while (I) the at least one of (XX) the amino resin precursor, (YY) the partially-hardened amino resin precursor, and (ZZ) the amino resin particle, and (II) the inorganic compound are dispersed in water.

14. The method of producing an amino resin composite particle as set forth in claim 13, wherein the step (a) further includes the step of:

(b) hardening the amino resin precursor by adding a catalyst, where the step (a) mixes the aqueous dispersion, in the presence of the emulsifier, with the shear force application, the aqueous dispersion containing (I) (XX) the amino resin precursor to be the amino resin particle, and (II) the inorganic compound to adhere thereon, in such a manner that (I) (XX) the amino resin precursor, and (II) the inorganic compound are dispersed in water.

15. The method of producing an amino resin composite particle as set forth in claim 13, wherein the step (a) further includes the steps of:

(c) preparing an emulsion of (XX) the amino resin precursor to be the amino resin particle, by mixing an aqueous dispersion of (XX) the amino resin precursor, and an aqueous solution of the emulsifier, (d) hardening (XX) the amino resin precursor by adding a catalyst into the emulsion thus prepared in the step (c), so as to prepare a suspension of (YY) the partially-hardened amino resin precursor, and (e) mixing, with the high shear force application, the suspension of (YY) the partially-hardened amino resin precursor, and (II) the inorganic compound to adhere thereon, where the step (a) mixes the aqueous dispersion, in the presence of the emulsifier, with the shear force application, the aqueous dispersion containing (I) (XX) the amino resin precursor to be the amino resin particle, and (II) the inorganic compound to adhere thereon, in such a manner that (I) (XX) the amino resin precursor, and (II) the inorganic compound are dispersed in water.

16. The method of producing an amino resin composite particle as set forth in claim 15, wherein the step (a) further includes the step of, prior to the step (e):
  (f) further adding into the suspension of (YY) the partially-hardened amino resin precursor an aqueous solution of the emulsifier.

17. The method of producing an amino resin composite particle as set forth in claim 16, wherein the step (a) further includes the step of, prior to the step (e):
  (g) adding into the suspension of (YY) the partially-hardened amino resin precursor an aqueous solution of formaldehyde.

18. The method as set forth in claim 13, wherein:
  the inorganic compound is added after making the emulsion in which the amino resin particle has an average particle diameter in a range of 1 µm to 30 µm.

19. A method of producing an amino resin composite particle, in which an inorganic compound is fixed as a child particle on a surface of an amino resin particle serving as a mother particle, and in which at least part of the child particle composed of the inorganic compound is substantially embedded in the surface of the amino resin particle with high shear force, comprising the step of:
  (a) (a-1) preparing a suspension or an emulsion from an aqueous dispersion with a shear force application, the aqueous dispersion containing (I) at least one of (XX) an amino resin precursor to be the amino resin particle, (YY) a partially-hardened amino resin precursor to be the amino resin particle, and (ZZ) an amino resin particle, on which the inorganic compound is to be fixed, (a-2) adding (II) an inorganic compound to the suspension or emulsion thus prepared, (II) the inorganic compound to adhere on the at least one of (XX) the amino resin precursor, (YY) the partially hardened amino resin precursor, and (ZZ) the amino resin particle, and (a-3) mixing, in the presence of an emulsifier, with the high shear force application, the suspension or emulsion thus prepared to contain (II) the inorganic compound, so as to fix (II) the inorganic compound thereon;

wherein the amino resin particle, on which the inorganic compound is to be fixed, is a hardened amino resin particle; and wherein: (i) the shear force is applied to mix the aqueous dispersion, by using a blade revolving at an impeller tip speed in a range between 2 m/s and 30 m/s, so as to shear, in the presence of an emulsifier, (I) the at least one of (XX) the amino resin precursor, (YY) the partially-hardened amino resin precursor, and (ZZ) the amino resin particle, and (II) the inorganic compound, while (I) the at least one of (XX) the amino resin precursor, (YY) the partially-hardened amino resin precursor, and (ZZ) the amino resin particle, and (II) the inorganic compound are dispersed in water; (ii) the shear force is applied to mix the aqueous dispersion, by colliding against each other at a discharging pressure between 3 MPa and 49 MPa, in the presence of an emulsifier, (I) the at least one of (XX) the amino resin precursor, (YY) the partially-hardened amino resin precursor, and (ZZ) the amino resin particle, and (II) the inorganic compound, while (I) the at least one of (XX) the amino resin precursor, (YY) the partially-hardened amino resin precursor, and (ZZ) the amino resin particle, and (II) the inorganic compound are dispersed in water: or (iii) the shear force is applied to mix the aqueous dispersion, by introducing or forcibly circulating at a discharging pressure of 0.1 MPa to 1.47 MPa, in the presence of an emulsifier, (I) the at least one of (XX) the amino resin precursor, (YY) the partially-hardened amino resin precursor, and (ZZ) the amino resin particle, and (II) the inorganic compound, in a bath tank of a mixing apparatus, the bath tank being provided with a baffle plate for turning a flow direction by 90 degrees, while (I) the at least one of (XX) the amino resin precursor, (YY) the partially-hardened amino resin precursor, and (ZZ) the amino resin particle, and (II) the inorganic compound are dispersed in water.

* * * * *